(12) United States Patent
Fukamachi et al.

(10) Patent No.: US 8,399,860 B2
(45) Date of Patent: Mar. 19, 2013

(54) METHOD FOR PREVENTING DETERIORATION OF EDIBLE OIL OR INDUSTRIAL OIL AND APPARATUS THEREFOR

(75) Inventors: Shimpei Fukamachi, Tokyo (JP);
Tetsuya Ogura, Jalisco (MX);
Yoshitane Kojima, Osaka (JP);
Yoshimitsu Tachi, Osaka (JP)

(73) Assignee: SKA Ltd., Tokyo (JP)

( * ) Notice: Subject to any disclaimer, the term of this patent is extended or adjusted under 35 U.S.C. 154(b) by 117 days.

(21) Appl. No.: 13/139,771

(22) PCT Filed: Dec. 18, 2009

(86) PCT No.: PCT/JP2009/007024
§ 371 (c)(1),
(2), (4) Date: Jun. 15, 2011

(87) PCT Pub. No.: WO2010/073572
PCT Pub. Date: Jul. 1, 2010

(65) Prior Publication Data
US 2011/0248189 A1    Oct. 13, 2011

(30) Foreign Application Priority Data

Dec. 26, 2008   (JP) ................................. 2008-334228
Apr. 7, 2009    (JP) ................................. 2009-093041
Sep. 14, 2009   (WO) .................. PCT/JP2009/004582

(51) Int. Cl.
*G21K 5/02*   (2006.01)
*A61L 2/08*   (2006.01)

(52) U.S. Cl. ............... 250/492.1; 250/492.3; 250/495.1; 422/22; 426/238

(58) Field of Classification Search ............... 250/492.1, 250/492.3, 495.1; 422/22; 426/238
See application file for complete search history.

(56) References Cited

U.S. PATENT DOCUMENTS

| 2008/0131580 A1* | 6/2008 | Sasaki et al. ................... 426/615 |
| 2010/0173159 A1* | 7/2010 | Takashi ......................... 428/404 |

FOREIGN PATENT DOCUMENTS

| JP | 7-135072   | 5/1995  |
| JP | 9-100489   | 4/1997  |
| JP | 11-346652  | 12/1999 |

(Continued)

OTHER PUBLICATIONS

International Preliminary Report on Patentabiliy issued with respect to International Application No. PCT/JP2009/007024, mailed Aug. 25, 2011.

(Continued)

*Primary Examiner* — Nikita Wells
(74) *Attorney, Agent, or Firm* — Greenblum & Bernstein, P.L.C.

(57) ABSTRACT

A fluororesin-coated electric wire cable is wound around a ring-shaped groove defined by an outer periphery of a cylinder and two flange edges immersed in an edible oil in a tank, forming each oscillating unit having a coil part; and the oscillating units are connected to an electromagnetic wave generator through a relay unit. Electromagnetic waves are irradiated from the coil parts based on an alternating current having a single frequency, an alternating current having a plurality of single frequencies different from one another, or an alternating current having a timewise varying frequency, the alternating currents each being within a frequency band of 4 kHz to 25 kHz, and a treatment based on a far-infrared heater or far-infrared ceramic is used combinedly therewith, to prevent deterioration of an edible oil or industrial oil.

6 Claims, 24 Drawing Sheets

(a)

(b)

FOREIGN PATENT DOCUMENTS

| | | |
|---|---|---|
| JP | 2000-248291 | 9/2000 |
| JP | 2001-192694 | 7/2001 |
| JP | 2001-210457 | 8/2001 |
| JP | 2002-069476 | 3/2002 |
| JP | 2005-279583 | 10/2005 |
| JP | 3122701 | 5/2006 |
| JP | 2008-027728 | 2/2008 |
| JP | 2008-289835 | 12/2008 |

OTHER PUBLICATIONS

International Search Report for International Application No. PCT/JP2009/007024, mailing date is Mar. 16, 2010.

* cited by examiner

FIG. 2
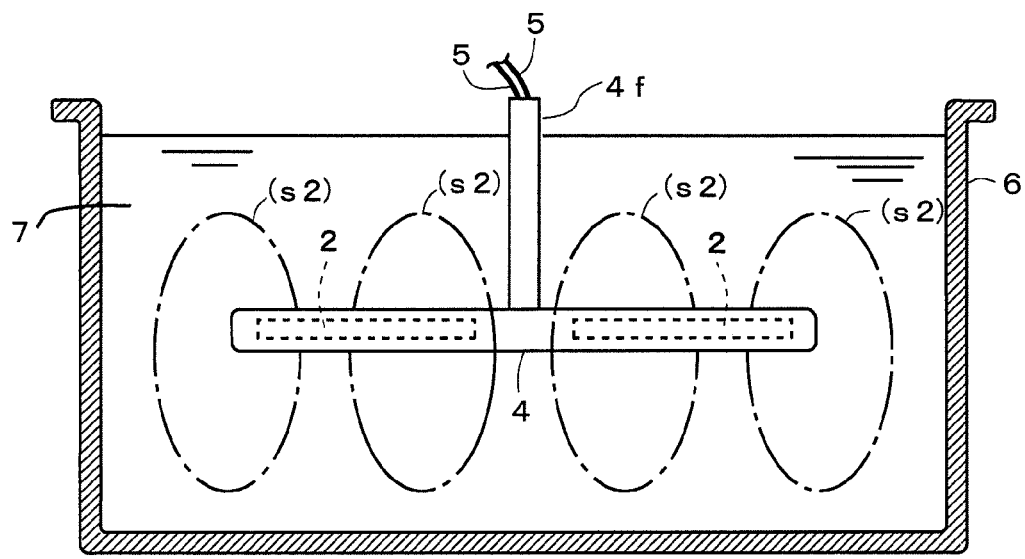
(a)
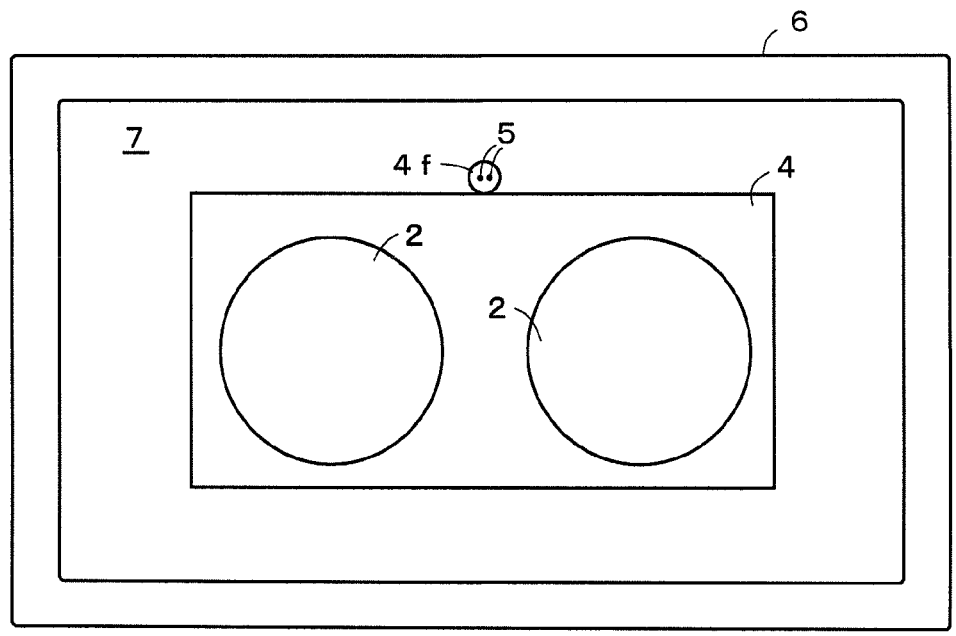
(b)

FIG. 3
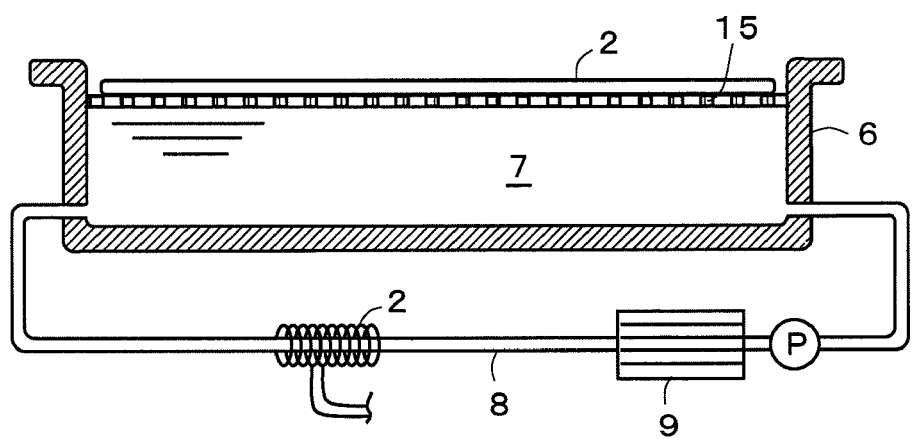
(a)
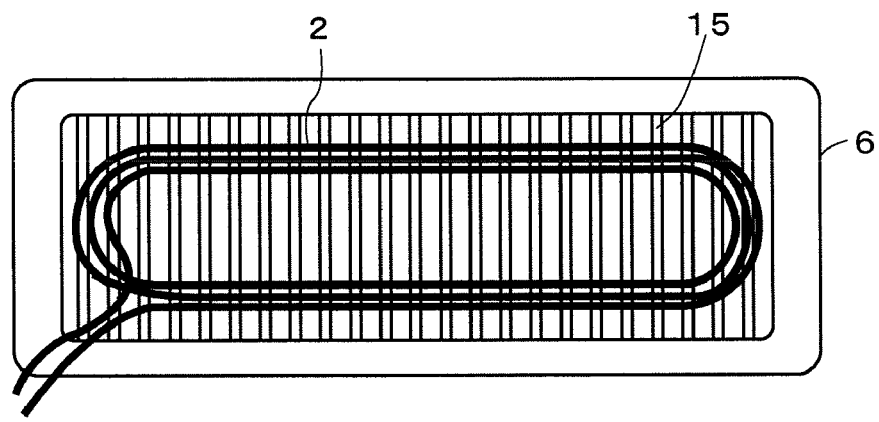
(b)

F I G. 9
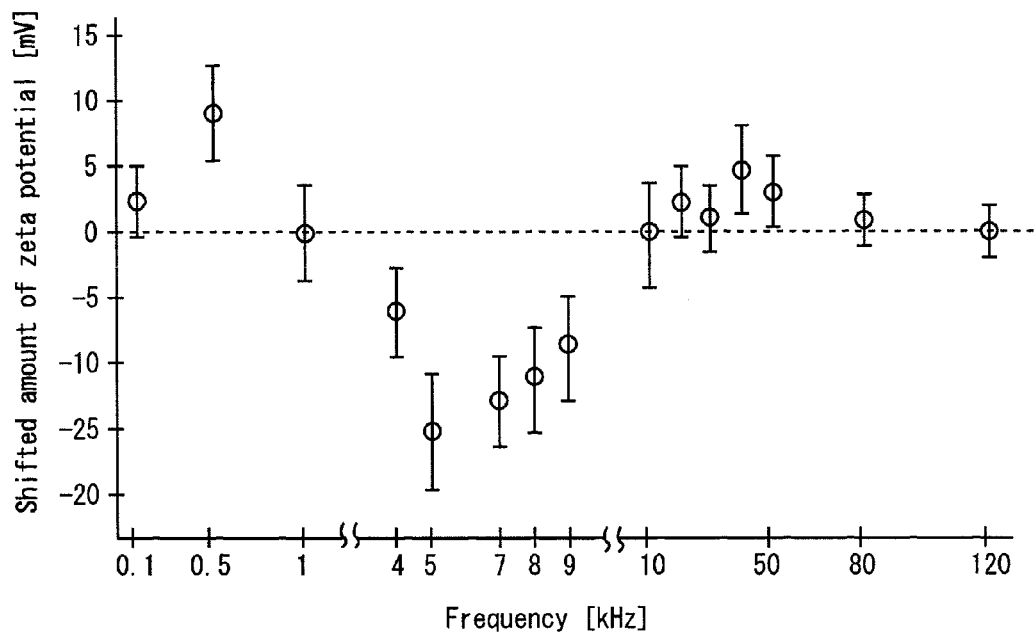

F I G. 1 0
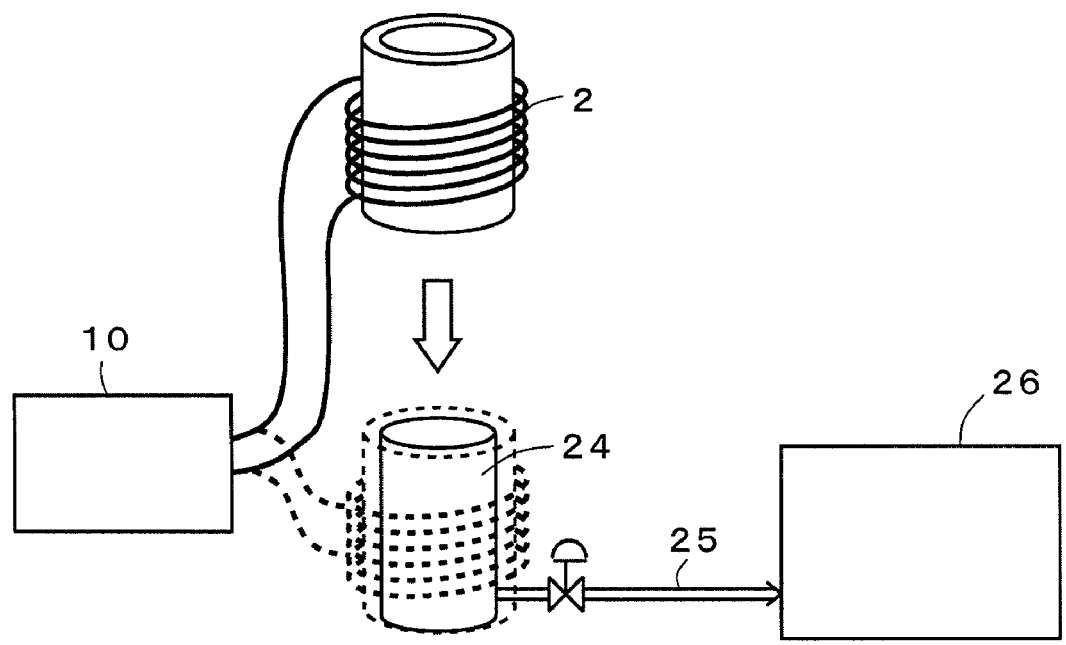

FIG. 11
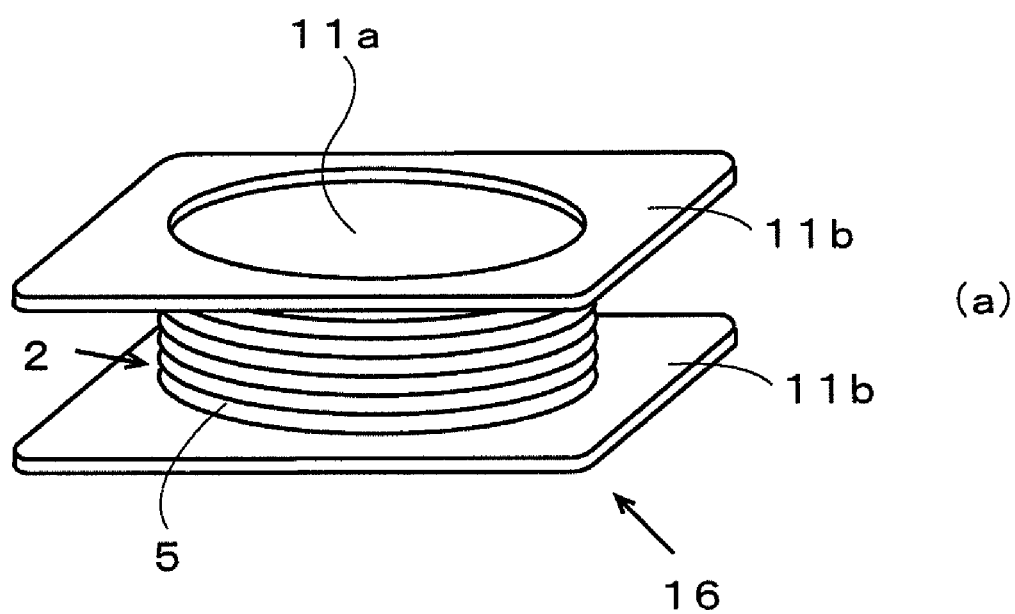
(a)
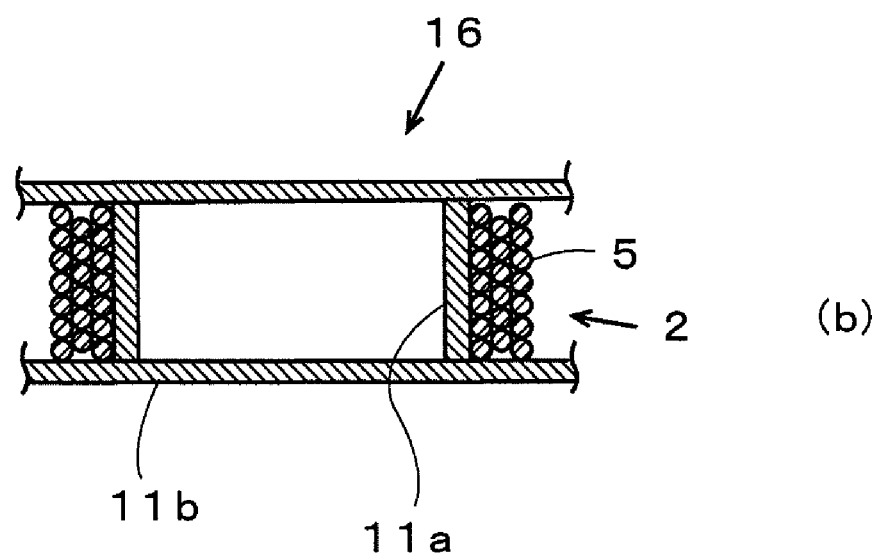
(b)

FIG. 13
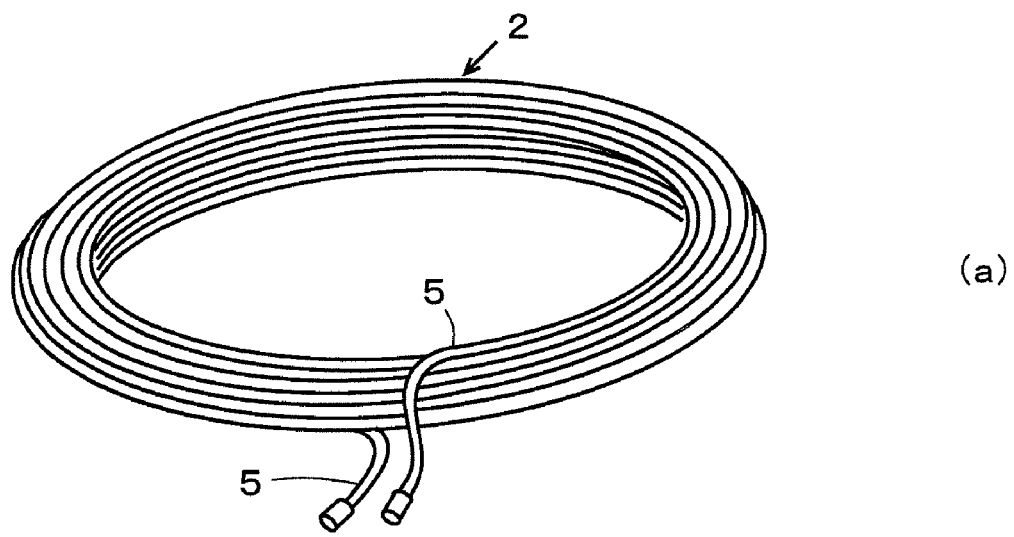
(a)
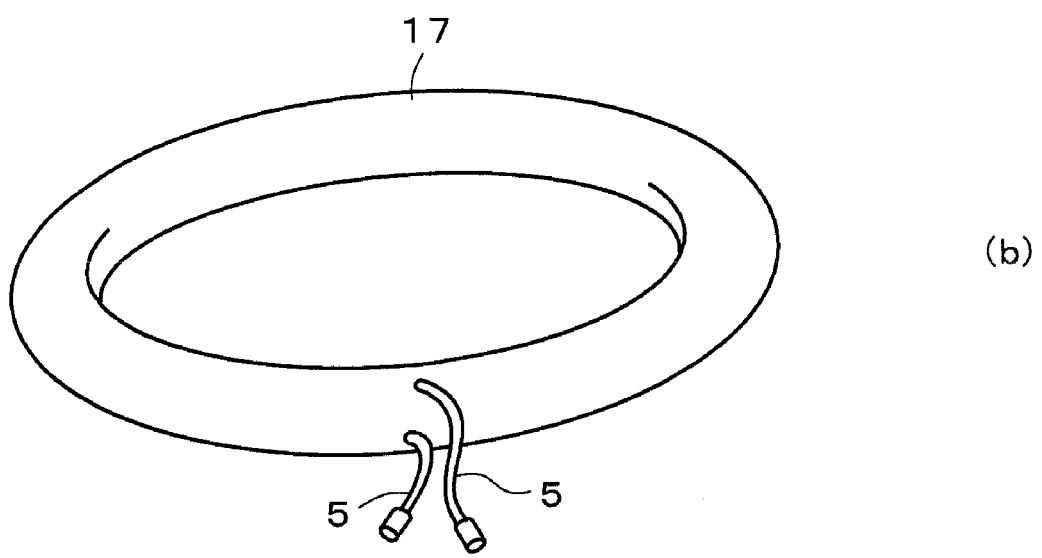
(b)

FIG. 14
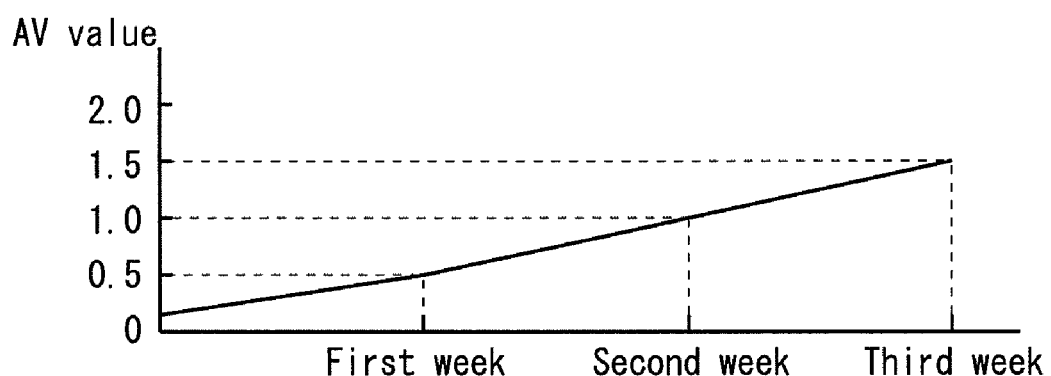
(a)
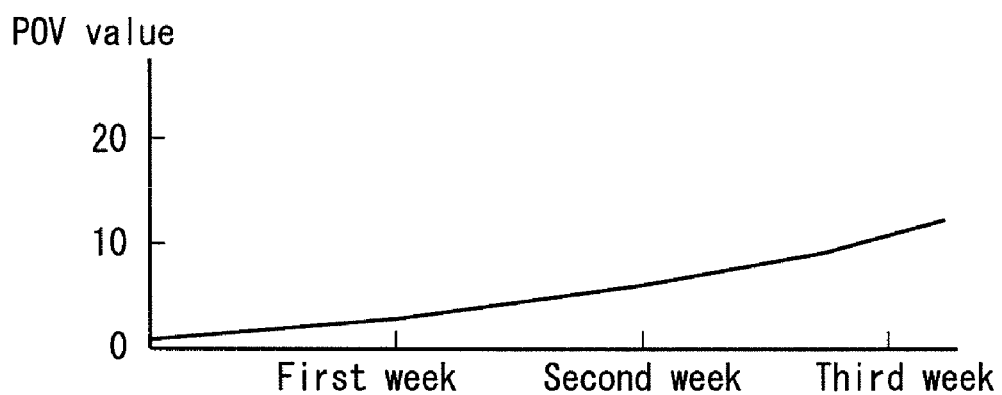
(b)

FIG. 15
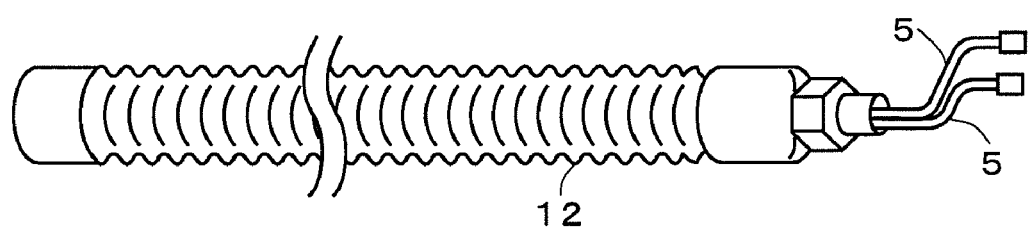
(a)
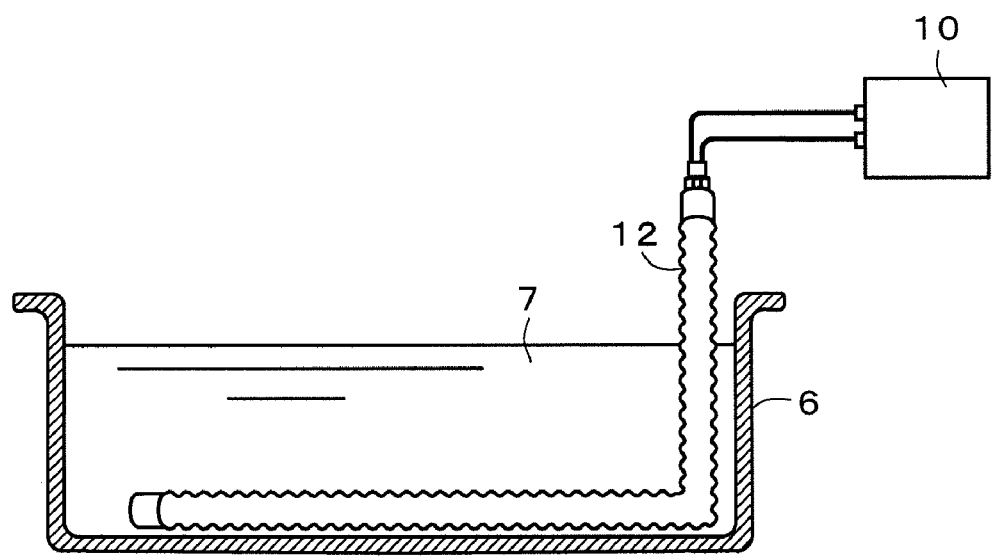
(b)

F I G. 1 6
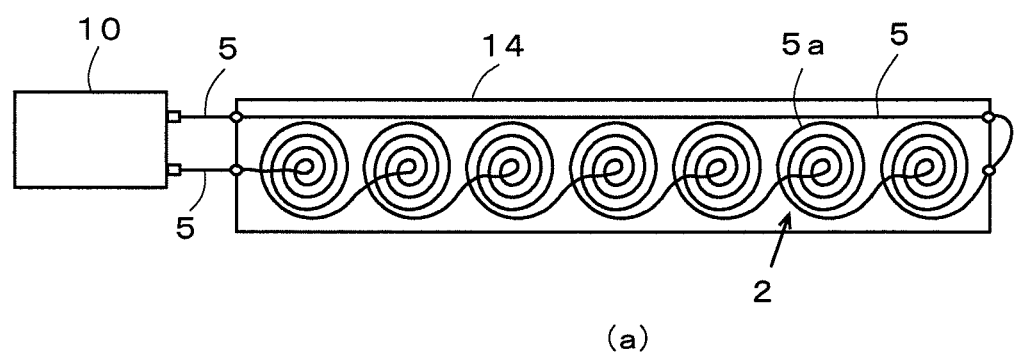
(a)
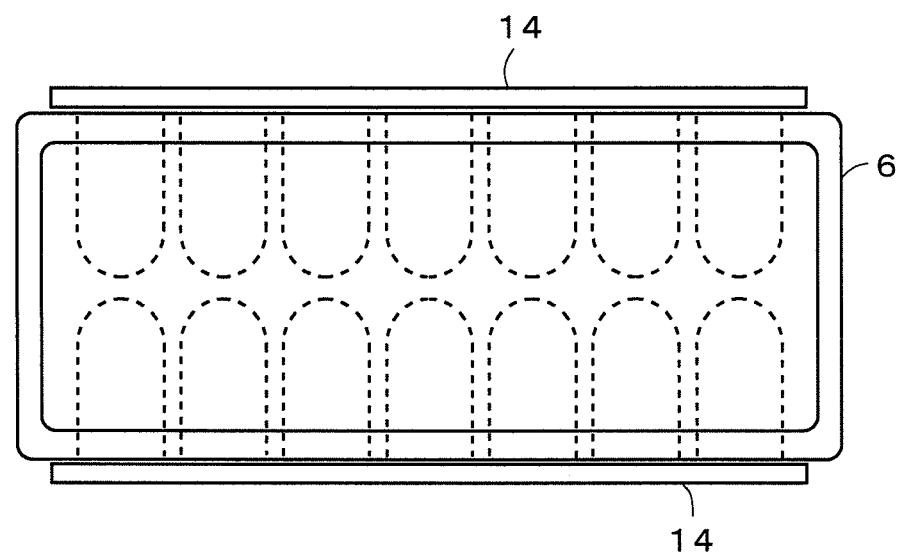
(b)

FIG. 17
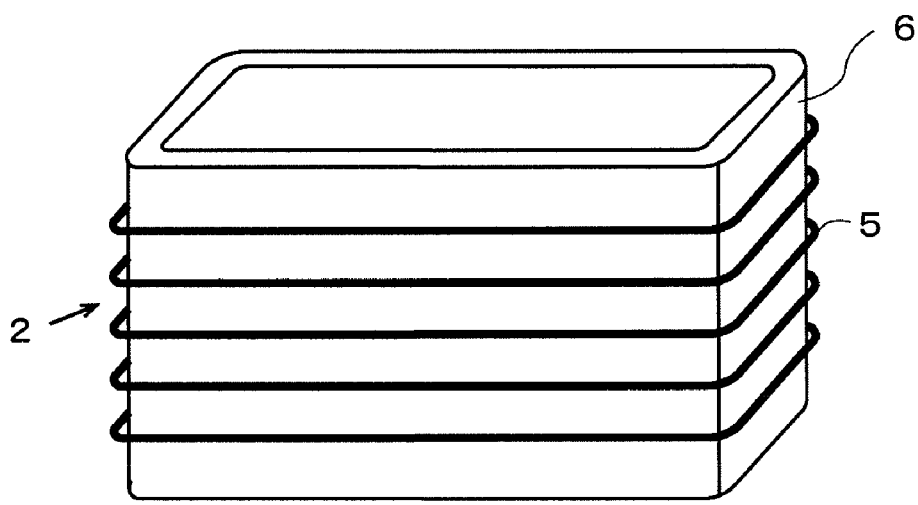
(a)
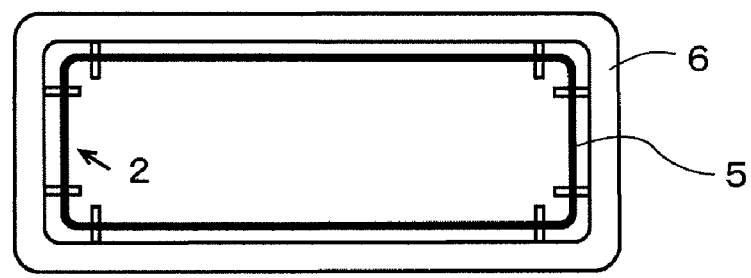
(b)

F I G. 1 8
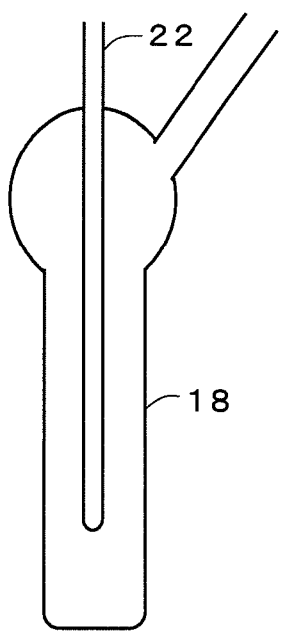
F I G. 1 9
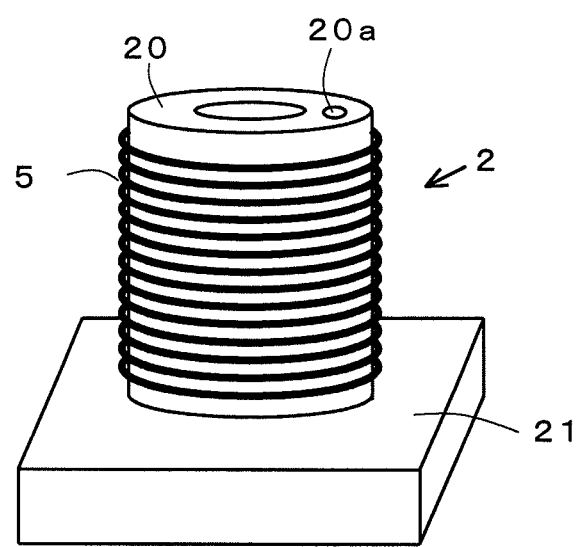

FIG. 24
(a) 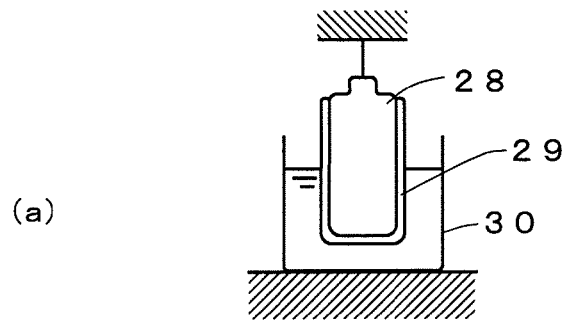
(b) 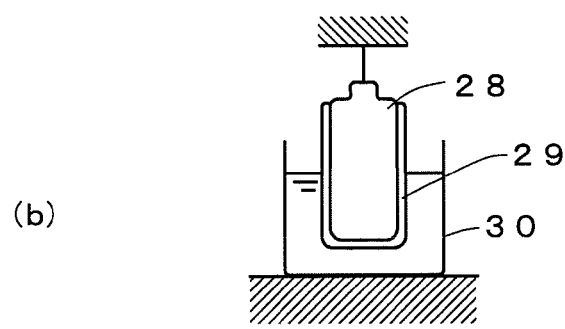
(c) 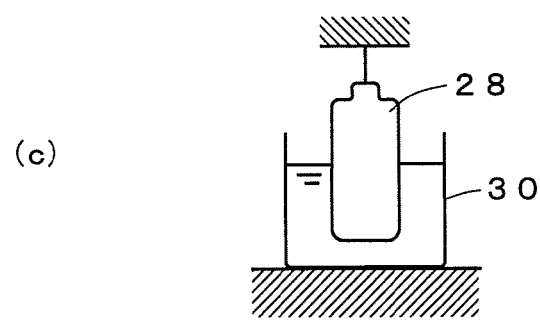
(d) 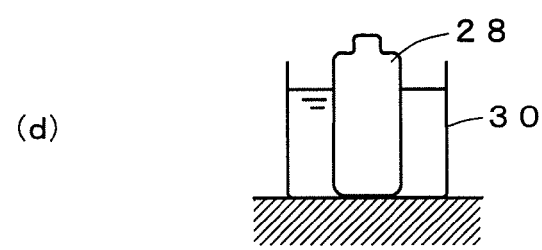

FIG. 25
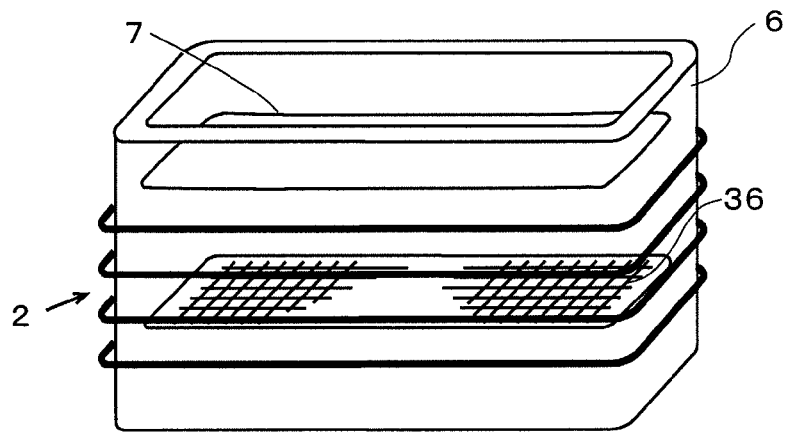
(a)
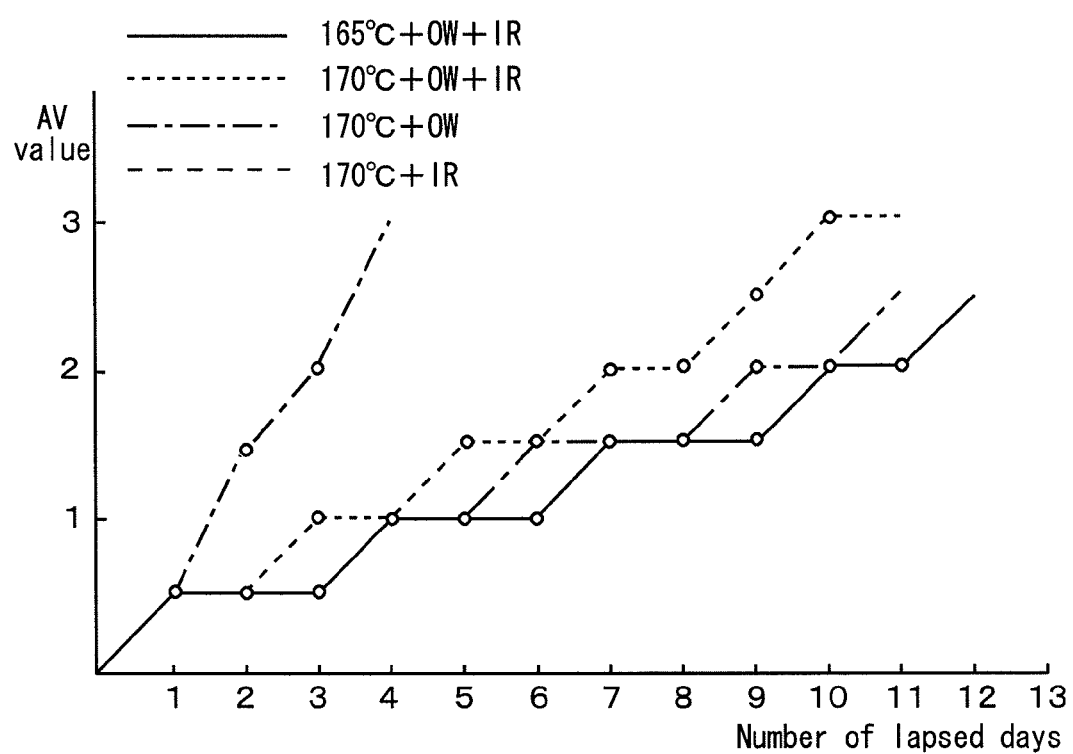
(b)

FIG. 27
(c) Untreatment
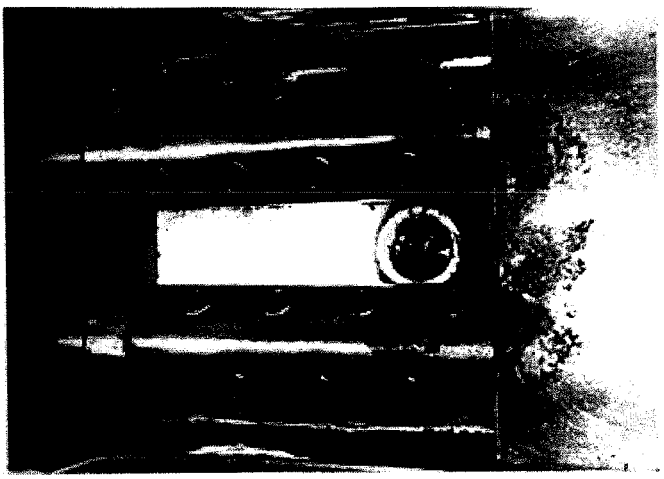
(b) After oil watcher treatment for 1 months
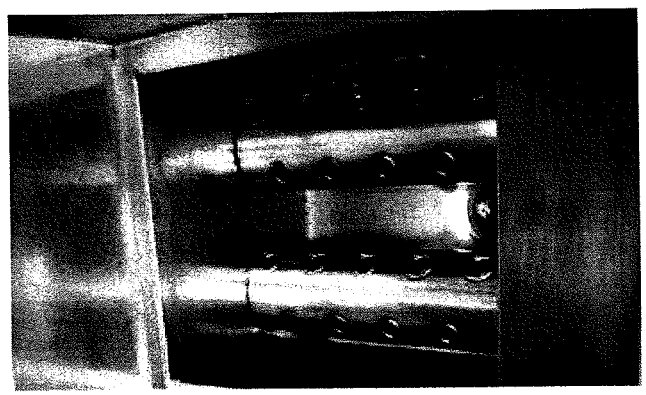
(a) After oil watcher treatment for 2 months

METHOD FOR PREVENTING DETERIORATION OF EDIBLE OIL OR INDUSTRIAL OIL AND APPARATUS THEREFOR

BACKGROUND OF THE INVENTION

1. Field of the Invention

The present invention relates to a method for preventing deterioration of an edible oil or an industrial oil, and an apparatus therefor.

2. Description of the Related Art

Edible oils have been conventionally and frequently used for cooking. However, edible oils are apt to be oxidizedly deteriorated, so that various countermeasures for preventing oxidative deterioration have been taken.

For example, as an apparatus for preventing oxidation of edible oil, which apparatus is capable of safely and effectively preventing oxidation of edible oil without subjecting a person involved in a frying work to a danger such as an electrical shock, JP2002-69476A discloses a method for preventing oxidation of edible oil, configured to apply a DC voltage of a cathode to a semiconductor portion of a supplying unit for supplying a substance (to be obtained by adding a transition element or an oxide thereof to a silicon oxide-containing compound) for supplying ions having reducing elements to an edible oil, to thereby supply ions having the reducing elements to the edible oil.

Further, disclosed in JP9-100489A is a method for preventing oxidation of edible oil, exemplarily configured to insert an electron emitting electrode enclosed in an electrically insulative glass or resin, into an edible oil in an oil tank for storage and preservation or into a hot oil in a processing fryer for providing a fried food, in a manner to apply a high-voltage AC electrostatic potential generated from a high-voltage AC electrostatic potential generator of a high-voltage transformer, to the electrode.

Moreover, JP2008-289835A describes that it is possible to provide an apparatus for restricting oxidation of edible oil in a fryer, which apparatus is excellent in effect for restricting oxidation of edible oil and in effect for restricting heat deterioration of edible oil, by: connecting a minus high-potential generator and a minus high-potential generating terminal through a minus high-potential outputting line; adopting, as the minus high-potential generating terminal, an oil-facing plate made of an electroconductive metal; mounting an electrically insulative member to the oil-facing plate; immersingly placing the minus high-potential generating terminal in the interior of a filter or central tank connected to a fryer; and setting an area size of oil-facing plate of the minus high-potential generating terminal, correspondingly to an oil amount of the fryer.

Further, disclosed in JP2005-279583A is a method for purifying edible oil, configured to filter a used edible oil by a filtering material containing crushed pieces of granite porphyry containing hornblende.

Moreover, disclosed in JP2001-192694A is a method configured to: arrange a fresh oil bath, a reducing bath, a filtering bath, and a minus static electron generator, into a single group; store a supplemental fresh oil in the fresh oil bath; store a non-fresh oil having been oxidizedly deteriorated by usage and then filtered, in the reducing bath; and irradiate minus static electrons at a high voltage of 8,000 volts to the non-fresh oil from the minus static electron, thereby reducing the acid value thereof.

[Patent Document 1] JP2002-69476A
[Patent Document 2] JP9-100489A
[Patent Document 3] JP2008-289835A
[Patent Document 4] JP2005-279583A
[Patent Document 5] JP2001-192694A

SUMMARY OF THE INVENTION

The inventions described in the Patent Documents necessitate thermal energy, high potential electrical energy, and the like, except for that described in the Patent Document 3. Further, the applicable oils are electrically insulative, so that the inventions each fail to obtain a wide range reduction potential, and the inventions are mainly based on a catalytic reduction reaction, thereby restricting oxidative degradation of oils to the utmost, to such an extent to slightly extend a period of time for exchange/recycle of waste oil.

In turn, the present inventors have developed a technique configured to apply a modulated electromagnetic wave treatment to various fluids to facilitate subsequent handling of the fluids, and the technique has been utilized in various technical fields. The details of the technique have been disclosed in Japanese Patent No. 3247942, and the like.

After filing the patent application having been matured into the right of the above patent, the present inventors have found out that a selective usage of an electromagnetic wave generator between a reducing type and an oxidizing type as a modulated electromagnetic wave treatment apparatus enables to appropriately deal with differences among properties of substances contained in treatment-targeted waters, respectively, thereby preventing formation of attached substances onto wall surfaces constituting a flow passage through which each treatment-target water flows, in a manner to obtain patents based thereon such as Japanese Patent No. 4257747, Japanese Patent No. 4305855, and the like.

In this way, it has been enabled to apply the modulated electromagnetic wave treatment as noted above to each treatment-targeted water, so that a flow passage, through which the treatment-target water flows, is mainly allowed to be kept in an unclogged state for a long time of period, without deposition of attached substances onto inner walls of the flow passage. However, the modulated electromagnetic wave treatment technique developed by the present inventors has not been yet applied to prevention of oxidative degradation of edible oil.

Further, countermeasures against deterioration have been desired for industrial oil as well.

It is therefore an object of the present invention to utilize the electromagnetic wave treatment technique developed by the present inventors, to thereby establish an oxidative degradation preventing technique of edible oil or industrial oil, which technique is superior to those in the conventional.

The object of the present invention is achieved by the following solving means.

Namely, the present invention resides in a method for preventing deterioration of an edible oil or an industrial oil, comprising the step of:

conducting an electromagnetic wave treatment of an edible oil or an industrial oil, by electromagnetic waves based on (a) an alternating current having a single frequency, (b) an alternating current having a plurality of single frequencies different from one another, or (c) an alternating current having a timewise varying frequency, the alternating currents (a), (b), and (c) each being within a frequency band of 4 kHz to 25 kHz.

Further, the present invention resides in: an apparatus for preventing deterioration of an edible oil or an industrial oil, comprising:

a coil part, which is immersed in a fat/oil in an edible oil tank or industrial oil tank, or which is provided near the edible oil tank or industrial oil tank; and an electromagnetic wave generator configured to flow, through the coil part, (a) an alternating current having a single frequency, (b) an alternating current having a plurality of single frequencies different from one another, or (c) an alternating current having a timewise varying frequency, the alternating currents (a), (b), and (c) each being within a frequency band of 4 kHz to 25 kHz.

In the above, it is also possible to conduct a treatment by a far-infrared heater or far-infrared ceramic, combinedly with the electromagnetic wave treatment.

As compared to a case (hereinafter simply called "untreatment" as the case may be) where the electromagnetic wave treatment according to the present invention is not applied to an edible oil or industrial oil, the present invention exhibits an effect for remedying deterioration of an edible oil or industrial oil when the same is treated according to the present invention by electromagnetic waves based on (a) an alternating current having a single frequency, (b) an alternating current having a plurality of single frequencies different from one another, or (c) an alternating current having a timewise varying frequency, the alternating currents (a), (b), and (c) each being within a frequency band of 4 kHz to 25 kHz.

It has been proven that the following effects are obtained when the electromagnetic wave treatment of the present invention is applied to an edible oil upon production of "tempura" (Japanese deep-fried food):

1) the edible oil is decreased in usage amount;
2) a tempura (fried food) is made to be more delicious;
3) the cooking temperature of the edible oil is lowered by 10 to 15° C.;
4) the AV value of the edible oil can be kept at 1.0 to 1.5;
5) the edible oil is restricted in viscosity increase;
6) the oil odor and oil smoke of the edible oil are decreased;
7) divergence of water from the edible oil is promoted;
8) suction of the edible oil into a batter of tempura is restricted;
9) attachment of carbides and the like to an oil bath is restricted;
10) discoloration of the edible oil is restricted;
11) bubbling of the edible oil is restricted; and
12) the TPM value of the edible oil is decreased, or is restricted in increase.

Among the above, the effects 4) to 6), and 10) to 12) are considered to be chemical ones, respectively, and the remaining effects 1), 3), and 7) to 9) are considered to be physical ones, respectively. Here, the effect 2) appears to be a secondary one accompanying to the chemical effect(s) and physical effect(s), since the taste of the tempura is regarded to be made better as a natural result when even one of the effects of the remaining items is exhibited.

1. Re Chemical Effect:

Edible oils each mainly comprise a glycerin oleate (triglyceride) represented by the formula (1):

[Formula 1]

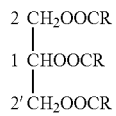

I in the formula, RCOO— indicates the unsaturated fatty acid residue. Further, upon production of a tempura, the oil heated to a temperature higher than the boiling point of water is contacted with a batter of the tempura, which batter contains much water, such that the water is immediately vaporized and turned into a vapor the most of which escapes into the atmosphere, but part of the vapor is dissolved in the oil to thereby hydrolyze it (formula (1)).

Although it is expediently assumed here that the ester at a site 1 is hydrolyzed, hydrolyses of those at sites 2 and 2' is also caused. Further, hydrolysis of the formulae (2) and (3) is also progressed simultaneously.

[Formula 2]

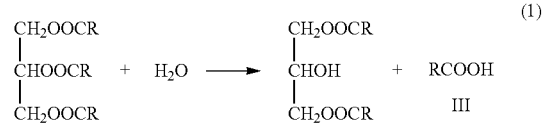

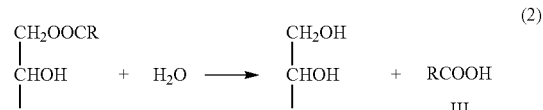

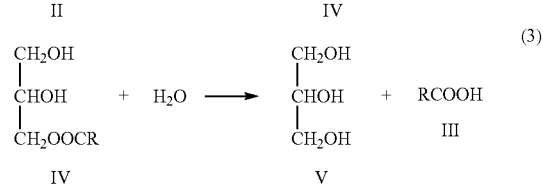

The thus produced diacylglyceride (II), and the monoacylglyceride (IV), which is a hydrolysis product of the diacylglyceride (II), are excellent surfactants, respectively, which are causative substances of bubbles to be seen upon production of tempura. Further, these hydrolysis products are also considered to largely contribute to viscosity increase.

It is noted that the AV value means an amount in mg of KOH required for neutralizing the free fatty acid (III) contained in 1 g of sample oil, and further progressed hydrolysis increases this value more.

Thus, if an increase of AV value is restricted by the electromagnetic wave treatment of the present invention, this suggests that the treatment has acted to remove water in the oil before the reactions, and if the AV value is decreased by the electromagnetic wave treatment, this suggests that reactions reverse to the hydrolysis of the formulae (1), (2), and (3) have been caused, i.e., re-esterification has been caused, by decrease (removal) of the water contained in the system.

Further, the RCOO— in the edible oil (I) is an unsaturated fatty acid group, which has a double bond (—C=C—). This readily reacts with oxygen $O_2$, to produce a hydroperoxide (VI) (formula (4)):

[Formula 3]

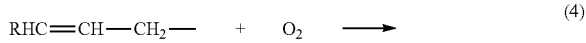

-continued

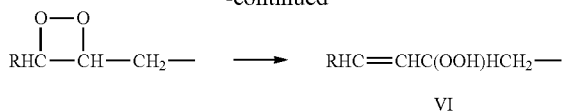

Although the hydroperoxide (VI) is relatively stable, its peroxyl group (—OOH) is thermally unstable and is turned into aldehyde, ketone, or the like by subsequent reactions. Further, the hydroperoxide (VI) oxidizes iodine ions (I⁻) of an iodide according to the formula (5), to produce iodine $I_2$:

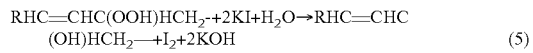

The reaction formula (5) provides a POV value, which is a value (mmol/mL) obtained by quantifying the iodine $I_2$ produced according to this reaction formula (5).

2. Re Physical Effect

In the above-described classification, the following items have been classified into physical effects, where presence of a surface-activating substance(s) is conceivable as one image common to these effects:

1) the edible oil is decreased in usage amount;
3) the cooking temperature of the edible oil is lowered by 10 to 15° C.;
8) suction of the edible oil into a batter of tempura is restricted; and
9) attachment of carbides and the like to an oil bath is restricted.

When the heated edible oil is contacted with a starting material of tempura, particularly with a batter thereof, hydrolysis of the compound (I) is caused by the water contained in the starting material (reaction formula (1)), thereby generating oleic acid and diacylglycerin, which are both excellent surfactants, respectively. Although the oil literally has little affinity with water, the affinity therebetween is increased when a surfactant is present, so that the oil is allowed to readily permeate into a batter containing water as a main component. This results in an increased usage amount of the oil. In turn, although surfaces of carbides are hydrophobic and thus hardly attach to a batter containing much water, the surfaces are increased in hydrophilicity in the presence of a surfactant(s) and are made to be readily attached to the batter. Thus, the above physical effects, i.e., 1) the edible oil is decreased in usage amount;
8) suction of the edible oil into a batter of tempura is restricted; and
9) attachment of carbides and the like to an oil bath is restricted;

suggest decrease of the amount of oleic acid and diacylglyceride. Since the reaction formula (1) is a reversible reaction, this reaction is progressed in a direction reverse to the arrow when the water at the left side (reactant side) is decreased. Namely, it is supposed that both of the amount of the oleic acid and diacylglycerin are decreased then.

Concerning the item that "4) the AV value of the edible oil can be kept at 1.0 to 1.5;", experimental results have been obtained as described in the following embodiments, and these results suggest that water was removed from the oil upon production of tempura by virtue of application of an electromagnetic field of the present invention thereto during production of tempura.

Since water was removed from the oil upon production of tempura by virtue of application of an electromagnetic field of the present invention thereto during production of tempura, the item that "7) divergence of water from the edible oil is promoted;" can also be expected.

It has been thus revealed that the above effects 1) to 9), i.e., the effect for remedying deterioration of an edible oil is obtained, when the electromagnetic wave treatment defined by the present invention is conducted within a frequency band (4 kHz to 25 kHz), as compared to a situation where the electromagnetic wave treatment of the present invention is not applied to an edible oil ("untreatment").

This situation corresponds to a case shown in FIG. 9 to be described later where the electromagnetic wave treatment is conducted at a frequency (4 kHz to 25 kHz) for giving a minus zeta potential to the adopted and measured water containing therein colloidal particles of titanium oxide, and it is thus assumed that conduction of the electromagnetic wave treatment at the frequency (4 kHz to 25 kHz) defined in the present invention gives a minus zeta potential to the edible oil, upon production of tempura as well.

The situation also exhibits a consistency with another case shown in FIG. 9 where the electromagnetic wave treatment defined by the present invention is conducted at a frequency (frequencies at or below 1 kHz, and above 25 kHz) for giving a plus zeta potential to the adopted and measured water containing therein colloidal particles of titanium oxide, and where the effects 1) to 9), i.e., the effects for remedying deterioration of an edible oil were not seen.

It is thus assumed that conduction of the electromagnetic wave treatment of an edible oil according to the present invention at such a frequency, which is assumed to give a minus zeta potential to the edible oil, exemplarily restricts production of peroxides or oxides from the edible oil. Further, while the present invention is configured to conduct an electromagnetic wave treatment of an edible oil, by electromagnetic waves based on (a) an alternating current having a single frequency, (b) an alternating current having a plurality of single frequencies different from one another, or (c) an alternating current having a timewise varying frequency, the alternating currents (a), (b), and (c) each being within a frequency band of 4 kHz to 25 kHz; improvement as compared to a case of untreatment is assumed to be not obtained when frequencies within a certain range (from 100 Hz to the vicinity of 10,000 Hz shown in FIG. 9) are provided without specifically limiting a frequency of AC electromagnetic waves to be irradiated to an edible oil, because bondage and repulsion among those substances brought to be plus and minus zeta potentials are caused then, respectively.

In embodiments of the present invention to be described hereinafter, those examples are shown where electromagnetic waves based on (a) an alternating current having a single frequency, (b) an alternating current having a plurality of single frequencies different from one another, or (c) an alternating current having a timewise varying frequency, were applied to an edible oil upon production of tempura or to an industrial oil, and the effects of application of electromagnetic waves in each case were checked. It was further revealed that the same functions and effects were obtained by any electromagnetic waves based on any one of the frequencies (a) to (c) to be adopted then, insofar as the frequency was kept between 4 kHz and 25 kHz.

Further, fried foods, tempuras, and the like (hereinafter collectively called "tempuras") are each produced by covering a tempura material with a batter and introducing the tempura material into an edible oil having been heated a temperature (160 to 180° C.), which is considerably higher than a boiling point of water. The batter contains therein water, as a main component, in an amount of 80% or more. Further, although the water contained in the batter is heated and turned into a water vapor, the batter is enclosed within an oil layer over an exterior of the batter. Thus, most of the produced water vapor is not boiled to break the oil layer but internally directed to the cooler tempura material, in a manner to be condensed by contacting with the cooler material portion, thereby heating and cooking it. At this time, since a thermal energy (latent heat of vaporization) sufficient for heating 1 g of water to elevate its temperature by 540° C. is dissipated when 1 g of water vapor is condensed, it is possible to produce a tempura of 7 g or heavier by 1 g of water vapor assuming that the starting material of tempura is at 25° C.

Thus, it is considered to be optimum for a weight of water to be contained in a batter, to be slightly more than about one seventh of a weight of the starting material of tempura. If the content of water is excessively large, it is impossible to fry a batter into a crispy state, and if the content of water is excessively small, the tempura is scarcely heated sufficiently and the batter thereof is made to be easily scorched. Meanwhile, part of the water vapor breaks through the oil layer and escapes therefrom while the tempura is being cooked, and such a water vapor is observed as water vapor bubbles, which are produced steadily. It is noted that when 1 g of water is heated to 180° C., the water is turned into water vapor of about 1.5 L. When the starting material of tempura has been heated to 100° C., the produced water vapor is no longer utilized for cooking, so that the water vapor is directed to the exterior (oil layer), resulting in a vigorous degree of production of water vapor bubbles. In turn, when the water content of the batter is decreased, heat conduction therethrough is deteriorated and the degree of production of water vapor bubbles is weakened. It is therefore a skill of a professional of tempura cooking to estimate a progression of tempura cooking, by observing a state transition of water vapor bubbles upon production of tempura.

Batters of tempura each produce water vapor, upon contact with an oil having been heated to 180° C. Although it is well known that water is not easily vaporized, it is considered that a batter of tempura is swung by application of the alternating magnetic field by adopting the electromagnetic wave treatment apparatus of the present invention in a manner to help the water to be vaporized, as will be seen in embodiments of the present invention. It is further revealed that, since progression of tempura cooking is estimated based on a state of bubbling, bubbling substantially at the same degree as the usual is brought about at a temperature lower than a usual cooking temperature by 10° C. or more when the electromagnetic wave treatment of the present invention is conducted (see embodiment 5, and the like).

Here, it should be noted that, even when bubbling substantially at the same degree as the usual is brought about at a temperature lower than a usual cooking temperature by 10° C. or more by virtue of the electromagnetic wave treatment of the present invention, each tempura is assumed to be still cooked in a manner fully identical to a usual situation of tempura production, since the starting material of tempura is heated by condensation of water vapor. Only, a slight difference is considered to reside in an aspect that the batter is kept at a temperature, which is lower than the usual case by 10° C. or more. Nonetheless, the temperature of the batter is rapidly elevated in the case of present invention once the water content in the batter is decreased, i.e., once the degree of bubbling is started to be decreased, in a manner to make a slight scorch on the batter, so that substantially no affections on a taste of a completed tempura are found.

In this way, it is very important from a standpoint of oil deterioration that the electromagnetic wave treatment of the present invention allows for production of a tempura at a temperature lower than the usual by 10° C. or more, without deteriorating its delicious taste. One of factors of deterioration is that oxygen in the air is added to an unsaturated bond(s) in each molecule of an edible oil, and it is assumed that the applicable molecule is firstly turned into a peroxide (which is to be measured as a POV) and is then turned into a carbonyl compound (which is to be measured as a CV), thereby bringing about a cause of a burnt oil odor.

Since it is typical that a reaction rate is doubled by a temperature elevation of 10° C. in a chemical reaction, it is resultingly expected that a rate of peroxide production is also decreased down to a half of the rate by a temperature lowering of 10° C. or more. It is considered that, since air is prevented from dissolving in an oil by virtue of bubbling therein during production of tempura, also the bubbles play an important role in the sense of preventing an oxidation reaction.

Further, it is assumed that deterioration of molecules of one kind of edible oil is caused by conversion thereof into a free fatty acid (which is measured as an AV) and diacylglyceride, by a reaction between the molecules and the water dissolved from the batter into the oil. However, since a hydrolysis rate is represented by a product of a reaction rate constant and a solubility of water, it is expected that both the reaction rate constant and the solubility are decreased by half when production of tempura is enabled at a temperature lower than the usual by 10° C. It is thus understood that the hydrolysis rate is lowered to about one fourth in a manner to restrict deterioration of molecules of the edible oil, thereby exhibiting an extremely remarkable effect of the present invention.

It has also been revealed that the electromagnetic wave treatment of the present invention exhibits an effect for evaporating water upon production of tempura. By virtue of exhibition of the water evaporating effect, it is enabled to elevate a temperature of a surface of the edible oil layer upon production of tempura, in a manner to thereby affect on the fact that the electromagnetic wave treatment of the present invention allows for production of a tempura at a temperature lower than the usual by 10° C. or more without deteriorating the delicious taste of the tempura.

Further, it has been proven that the electromagnetic wave treatment of the present invention brings about an effect for preventing attachment of carbides onto or an effect for peeling carbides from that portion of a wall surface of a cooking apparatus which portion is contacted with an edible oil (see embodiment 10).

It is noted that the edible oil in case of the present invention means plant oils such as castor oil, wood oil, salad oil, soybean oil, camellia oil, palm oil, rapeseed oil, corn oil, olive oil, and the like, and animal oils such as lard, beef tallow, bone oil, fish oil, butter, whale oil, cod-liver oil, shark-liver oil, and the like.

Further, the electromagnetic wave treatment of the present invention is also usable to prevent deterioration of an industrial oil such as a lubricating oil or cutting oil, in addition to edible oils. It is occasional that part of a lubricating oil or cutting oil is oxidized into a tar-like substance which is then attached to a pipe or the like such that the tar-like substance can not be peeled, during an operation of a machine using the lubricating oil or cutting oil. Even during usage of such a lubricating oil or cutting oil, the tar-like substance attached to a pipe or the like is easily peeled therefrom or the tar-like substance is rarely attached to the machine, when the electromagnetic wave electromagnetic waves of the present invention are applied thereto.

Moreover, it also has been revealed that prevention of deterioration of an edible oil or industrial oil is enabled, by using a treatment by a far-infrared heater or a treatment by a far-infrared ceramic, combinedly with the treatment by electromagnetic waves based on (a) an alternating current having a single frequency, (b) an alternating current having a plurality of single frequencies different from one another, or (c) an alternating current having a timewise varying frequency, the alternating currents (a), (b), and (c) each being within a frequency band of 4 kHz to 25 kHz.

According to the present invention, deterioration of an edible oil or industrial oil is not progressed by virtue of the electromagnetic wave treatment of the present invention or by virtue of combined usage of the electromagnetic wave treatment of the present invention and a treatment by a far-infrared heater or far-infrared ceramic as compared to a situation where these treatments are not conducted, so that the service life of the edible oil or industrial oil is prolonged as compared to other purifying methods. Further, the electromagnetic wave treatment of the present invention or the treatment combiningly using the electromagnetic wave treatment of the present invention and the treatment by the far-infrared heater or far-infrared ceramic, is energy-saving as compared to the conventional edible oil purifying treatments each using a high-voltage, and is allowed to relatively easily conduct an operation for preventing deterioration of an edible oil or industrial oil.

BRIEF DESCRIPTION OF THE DRAWINGS

FIG. 2 includes a side cross-sectional view (FIG. 2(a)) and a plan view (FIG. 2(b)) showing a situation where the fluororesin casing of FIG. 1 is immersed in an edible oil contained in a deep oil tank and an electromagnetic wave treatment is being conducted;

FIG. 3 includes a side cross-sectional view (FIG. 3(a)) and a plan view (FIG. 3(b)) of the electromagnetic wave treatment apparatus according to the embodiment 1 in case that the apparatus is provided for an edible oil or industrial oil contained in a large-sized oil tank;

FIG. 9 is a graph of a relationship between a shifted amount of zeta potential relative to a reference zeta potential ("zeta potential of fine titanium oxide particles in water without electromagnetic wave treatment"=0) of fine titanium oxide particles in a potassium chloride water solution, and a frequency, where the electromagnetic wave generator of FIG. 4 or FIG. 5 is used;

FIG. 10 is an explanatory view of a procedure for measuring a zeta potential;

FIG. 11 includes a perspective view (FIG. 11(a)) and a longitudinal cross-sectional view (FIG. 11(b)) of an oscillating unit comprising a coil part according to an embodiment 2;

FIG. 13 includes a perspective view (FIG. 13(a)) of an electric wire cable according to the present invention bundled into a ring shape, and a perspective view (FIG. 13(b)) of a coil part obtained by coating the whole of the ring-shaped cable with a fluororesin;

FIG. 14 includes graphs of transitions of an AV value and a POV value by an electromagnetic wave treatment of the embodiment 2, respectively;

FIG. 15 includes an outside view (FIG. 15(a)) of a concertina tube made of stainless steel internally including a coil part according to an embodiment 3, and a cross-sectional view (FIG. 15(b)) of an oil tank where the concertina tube internally including the coil part is immersed in an edible oil in the tank;

FIG. 16 includes a side view (FIG. 16(a)) of a coil part according to an embodiment 4 comprising an electric wire cable having spiral portions serially arranged on a flat plate, and a plan view (FIG. 16(b)) of an oil tank in a state where coil parts are arranged outside the sidewalls of the oil tank, respectively;

FIG. 17 includes a perspective view (FIG. 17(a)) of a coil part according to a variant of the embodiment 4 in a situation where the coil part is installed on an outer periphery of an oil tank of a fryer apparatus capable of effectively irradiating electromagnetic waves to a tempura oil, and a plan view (FIG. 17(b)) of the coil part in a situation where the same is installed on an inner periphery of the oil tank;

FIG. 18 is a schematic side view of an apparatus used in an experiment according to an embodiment 5;

FIG. 19 is a perspective view of the apparatus used in the experiment according to the embodiment 5;

FIG. 24 is an explanatory view of an apparatus for testing an effect for evaporating a water in an edible oil in cases of conduction and omission of the electromagnetic wave treatment of the present invention used in the embodiment 6;

FIG. 25 includes a perspective view (FIG. 25(a)) of an oil bath in case of combiningly using an electromagnetic wave treatment of the present invention and a ceramic-coated metal net used in an embodiment 7, and a graph (FIG. 25(b)) of transition of AV values of the oil in relation to the number of lapsed days according to the embodiment 7;

FIG. 27 includes photographs (FIG. 27(a) and FIG. 27(b)) of a part of a fryer in case that an electromagnetic wave treatment of the present invention used in an embodiment 10 was conducted, and a photograph (FIG. 27(c)) of a part of the fryer in case that the electromagnetic wave treatment of the present invention was not conducted.

DETAILED DESCRIPTION OF THE PREFERRED EMBODIMENTS

Embodiments of the present invention will be described with reference to the drawings.

Firstly described is an embodiment of a method configured to adopt a refined oil (shirashime-yu) (manufactured by Meito Yushi Kougyo Co., Ltd.), which is a kind of soybean oil, as an edible oil, and configured to conduct an electromagnetic wave treatment of an edible oil or industrial oil, by an electromagnetic wave generator for flowing therethrough (a) an alternating current having a single frequency, (b) an alternating current having a plurality of single frequencies different from one another, or (c) an alternating current having a timewise varying frequency, the alternating currents (a), (b), and (c) each being within a frequency band of 4 kHz to 25 kHz.

Figure 1:
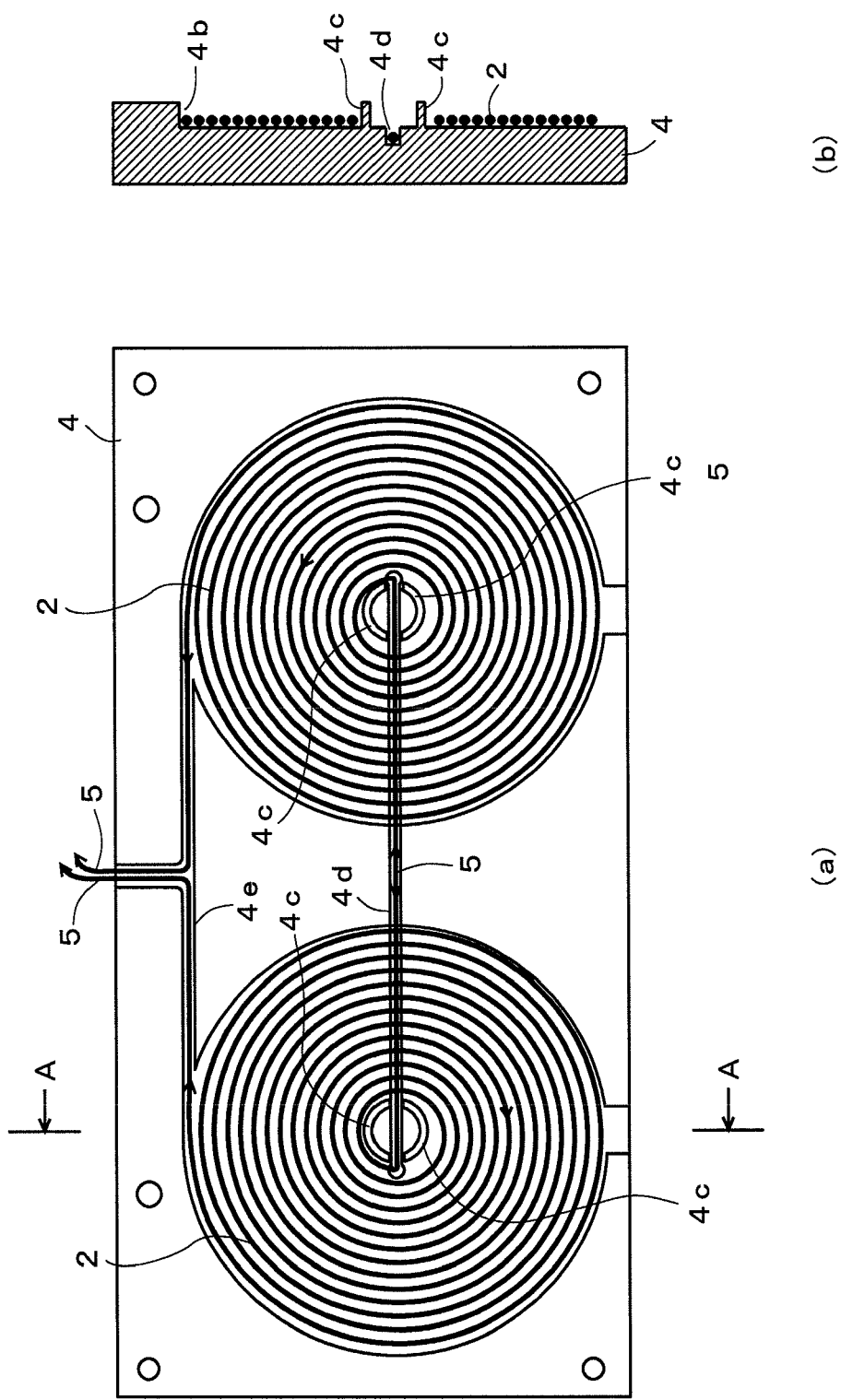
FIG. 1 includes a plan view (FIG. 1(a)) of a coil part of an electromagnetic wave treatment apparatus hermetically sealed in a fluororesin casing according to an embodiment 1, and a cross-sectional view (FIG. 1(b)) of FIG. 1(a) viewed from an arrow line A-A.

FIG. 1 shows a configuration where two coil parts 2, 2 to be used in an embodiment of the present invention and each constituted by winding one electric wire cable 5 into a disk shape, are adjacently arranged on a plane and hermetically sealed in a fluororesin-made casing 4. FIG. 1(a) is a plan view showing an inner structure of the fluororesin-made casing 4 before accommodating and hermetically sealing the two disk-shaped coil parts 2, 2 therein, and FIG. 1(b) is a cross-sectional view of FIG. 1(a) viewed from an arrow line A-A. The casing 4 has a groove 4e communicated with the outside air for leading out the electric wire cable 5 therethrough.

So as to arrange the two disk-shaped coil parts 2, 2 in two circular recesses 4b, 4b of the fluororesin-made casing 4, respectively, the electric wire cable 5 is wound into a disk shape sequentially from an outer periphery of each of cylindrical portions 4c, 4c provided at central portions of the two circular recesses 4b to thereby form the disk-shaped coil parts 2, 2, respectively. The procedure for winding this electric wire cable 5 is as follows.

Firstly, the central portion of the electric wire cable 5 is placed in and along a groove 4d connecting the two circular recesses 4b, 4b to each other; the electric wire cable is subsequently drawn to both circular recesses 4b, 4b along the groove 4d, and is then passed through cutouts of the cylindrical portions 4c, 4c and thereafter wound onto outer peripheries of the cylindrical portions 4c, 4c, to form disk-shaped coil parts 2, 2, respectively; and both ends of the electric wire cable 5 are finally taken out of the casing 4, firstly through the groove 4e connecting tangential lines of the disk-shaped coil parts 2, 2 to each other, and then through a pipe 4f (FIG. 2(a)) provided on the casing 4. Then, the two disk-shaped coil parts 2, 2 are covered thereon with a fluororesin-made plate (not shown), thereby establishing the fluororesin-made casing 4 accommodating the two disk-shaped coil parts 2, 2 hermetically sealed therein.

FIG. 2(a) and FIG. 2(b) shows a side cross-sectional view and a plan view of an edible oil tank, respectively, in a situation where the fluororesin-made casing 4 accommodating and hermetically sealing therein the two disk-shaped coil parts 2, 2 shown in FIG. 1, is immersed in an edible oil 7 of the edible oil tank 6.

Figure 4:
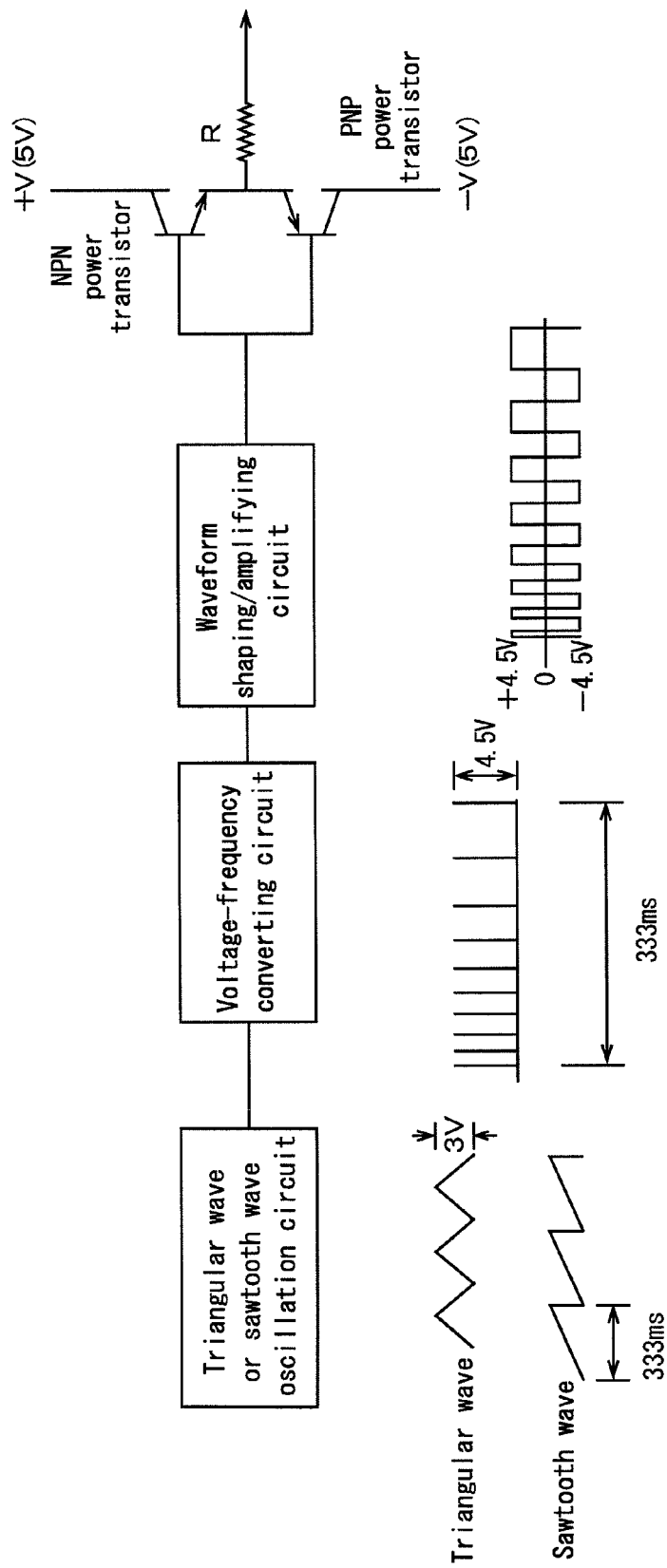
FIG. 4 is a circuit diagram of an electromagnetic wave generator according to the present invention.
Figure 5:
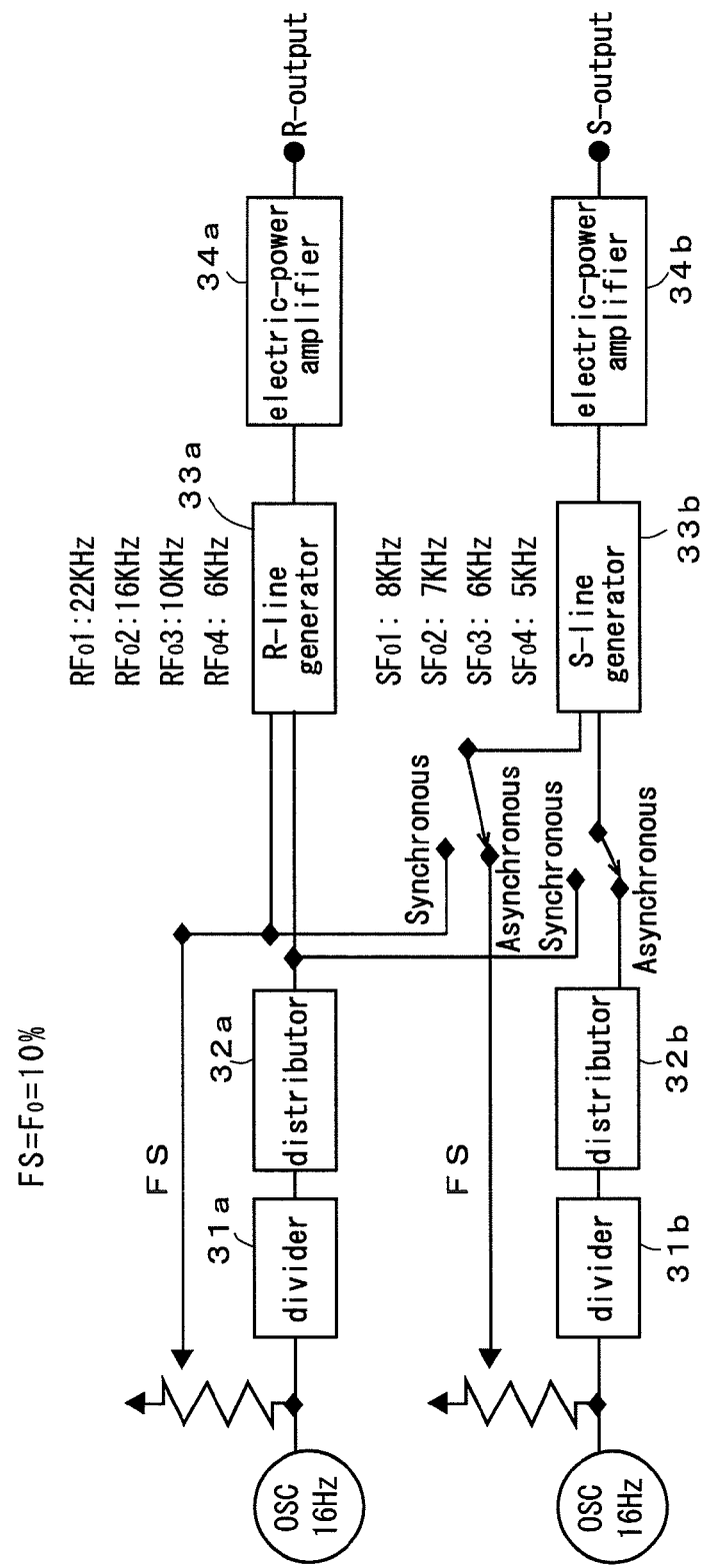
FIG. 5 is a circuit diagram of another electromagnetic wave generator according to the present invention.

When the both ends of one electric wire cable 5 wound to form the two disk-shaped coil parts 2, 2 in the fluororesin-made casing 4 shown in FIG. 1 and FIG. 2 are connected from the exterior of the casing 4 to an electromagnetic wave generator shown in FIG. 4 or FIG. 5, and (a) an alternating current having a single frequency, (b) an alternating current having a plurality of single frequencies different from one another, or (c) an alternating current having a timewise varying frequency, the alternating currents (a), (b), and (c) each being within a frequency band of 4 kHz to 25 kHz, is flowed through the electric wire cable 5 including the coil parts 2, 2, the electromagnetic waves form magnetic fluxes (s2) as indicated by dashed lines in FIG. 2(a), respectively, thereby effectively treating the whole of the edible oil in the oil tank 6 with electromagnetic waves.

The configuration of FIG. 2(a), where the two coil parts 2, 2 wound into disk shapes, respectively, are adjacently arranged on the plane, is configured to uniformly form the magnetic fluxes (s2) throughout the edible oil in the relatively deep oil tank (oil bath) 6.

Further, FIG. 3 shows an exemplary apparatus where the electromagnetic wave treatment technique of the present invention is applied to such a large-sized oil tank 6 containing therein an edible oil which tank is to be used in a food product processing factory, and FIG. 3(a) is a side cross-sectional view and FIG. 3(b) is a plan view of the apparatus. Since a large amount of edible oil is used in this case, an oil circulating flow passage 8 is provided outside the oil tank 6, and the circulating flow passage 8 is further provided with a coil part 2, thereby enabling to constantly conduct an electromagnetic wave treatment even during usage of the large amount of edible oil. Further, it is desirable that the surface of the edible oil in the oil tank 6 of FIG. 3(b) is covered with a lattice board 15 made of stainless steel, and the electric wire cable 5 is arranged as a coil ring on the lattice board 15. Moreover, when the oil tank 6 includes a location where an edible oil is dwelling, it is possible that a coil part (not shown) contained in a fluororesin-made casing is immersed in the location, together with the coil part 2 installed outside the circulating flow passage 8. It is noted that the circulating flow passage 8 is provided with a heater 9 for heating an edible oil to a temperature between 170 and 180° C. The apparatus of FIG. 3 is also applicable to a storage tank of an industrial oil.

Further, when a ceramic powder (pulverized matters of ceramic particles ("Iontechno ball" manufactured by Furutani Technical Laboratory Co.) having diameters of about 5 mm, for example) is arranged in the fluororesin-made casing 4 containing therein the coil parts 2 of FIG. 1 to FIG. 3 in addition to the coil parts 2, it is enabled to enhance the effect for preventing deterioration of an edible oil or industrial oil though the reason thereof is unknown.

Electromagnetic waves are to be irradiated from the electromagnetic wave generator shown in FIG. 4 to an edible oil or industrial oil, by flowing through the electromagnetic wave generator, (a) an alternating current having a single frequency, (b) an alternating current having a plurality of single frequencies different from one another, or (c) an alternating current having a timewise varying frequency. The electromagnetic wave generator shown in FIG. 4 is configured to subdivide a frequency of a triangular wave or sawtooth wave at which an oscillation circuit oscillates, by a voltage-frequency converting circuit, thereby obtaining a voltage corresponding to each frequency. The output from the voltage-frequency converting circuit is fed to a waveform shaping/amplifying circuit to set an intensity of electromagnetic waves and to amplify an electric-power therefor, thereby obtaining an electric-power of an appropriate amplitude, which is outputted to the coil parts 2 shown in FIG. 1 to FIG. 3.

Figure 6:
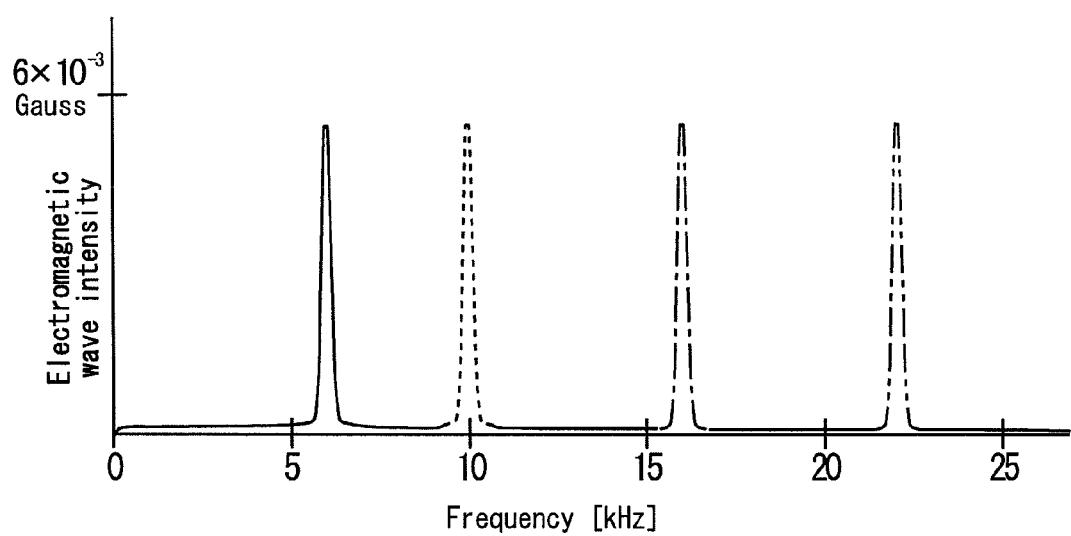
FIG. 6 is a graph of a relationship between an electromagnetic wave intensity and a frequency by the electromagnetic wave generator of FIG. 4.
Figure 7:
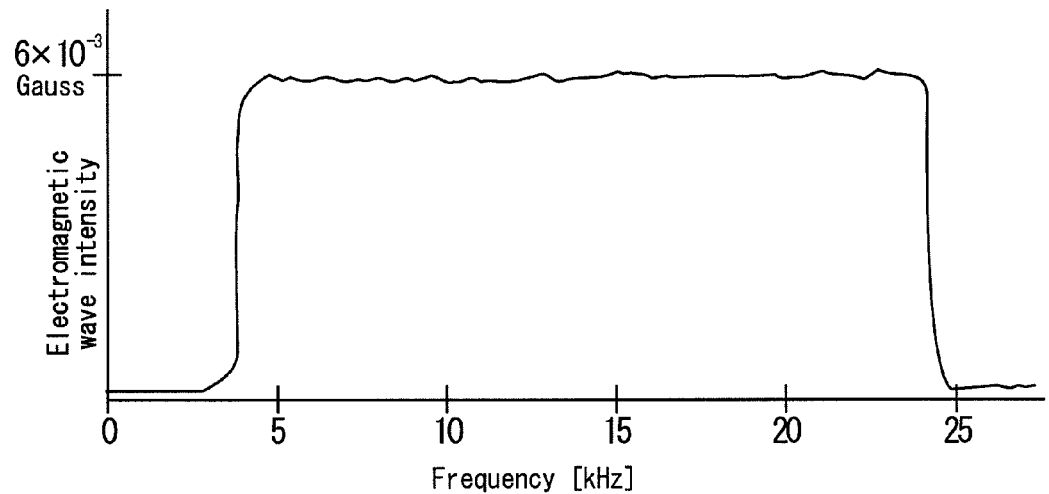
FIG. 7 is another graph of a relationship between an electromagnetic wave intensity and a frequency by the electromagnetic wave generator of FIG. 4.
Figure 8:
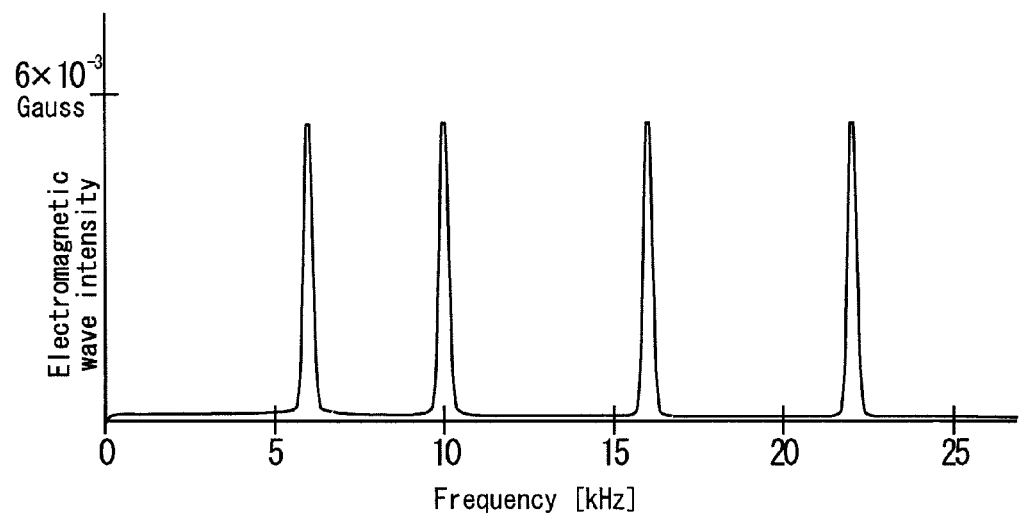
FIG. 8 is a graph of a relationship between an electromagnetic wave intensity and a frequency by the electromagnetic wave generator of FIG. 5.
Figure 20:
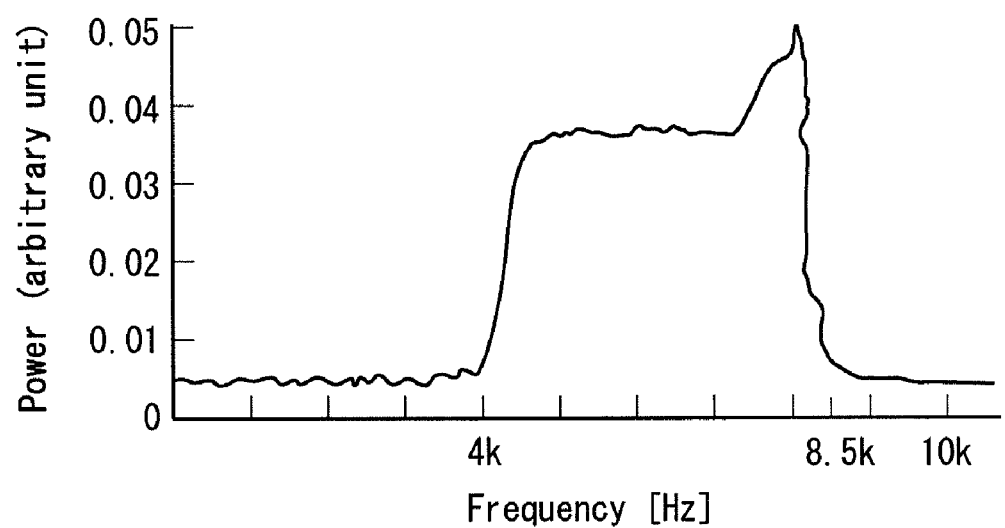
FIG. 20 is a graph of a relationship between an electromagnetic wave intensity and a frequency by an electromagnetic wave generator used in experiments according to embodiments 5, 6, 10, and 11.

Here, the electromagnetic wave generator shown in FIG. 4 is configured to generate electromagnetic waves by flowing therethrough (a) an alternating current having any single main frequency having a peak value at 6,000, 10,000, 16,000, or 22,000 Hz in an output waveform of the type shown in FIG. 6 by a solid line, broken line, dashed line, or two-dot chain line, respectively (it is possible to adopt any single frequency between about 4,000 and 25,000 Hz), or (c) an alternating current having a timewise varying frequency between about 4,000 and 25,000 Hz or between about 4,000 and 8,000 Hz shown in FIG. 7 or FIG. 20, respectively; while the electromagnetic wave generator shown in FIG. 5 is configured to generate electromagnetic waves by flowing therethrough (a) an alternating current having any single main frequency having a peak value at 6,000, 10,000, 16,000, or 22,000 Hz as shown in FIG. 6, respectively (it is possible to adopt any single frequency between about 4,000 and 25,000 Hz), or (b) an alternating current simultaneously having a plurality of single main frequencies different from one another having peak values at 6,000, 10,000, 16,000, and 22,000 Hz as shown in FIG. 8, respectively (it is possible to adopt any single frequency between about 4,000 and 25,000 Hz).

Further, both the electromagnetic wave generators shown in FIG. 4 and FIG. 5 are each capable of causing a zeta potential, which may be (+) or (−) correspondingly to a frequency at which each electromagnetic wave generator oscillates.

It is noted that an electromagnetic wave intensity means a strength of electromagnetic waves in a space, and its unit is [V/m] or [A/m]. Although the units are appropriately and selectively used depending on the purpose of use, the unit [A/m] is adopted in this embodiment (V is a voltage, A is an electric current, and m is a length). Further, the strength of electromagnetic waves is to be appropriately selected commensurately with an amount of an edible oil or industrial oil to be treated with electromagnetic waves. The strength or intensity of electromagnetic waves in this case is provided by a magnitude of a magnetic field, which magnitude is proportional to an electric current flowed through the coil part(s) 2 and which magnitude is obtained at a place where an electromagnetic wave intensity sensor is set.

The electromagnetic wave intensity is varied in magnitude, in proportion to a value of electric current to be flowed through the coil part(s) 2, as follows:

$$P = K \times i^2 \times t$$

P: electromagnetic wave irradiation energy [W] to edible oil or industrial oil to be treated;
i: electric current [A] flowed through coil part 2;
t: irradiation time [second]; and
K: constant [H/m³]

FIG. 9 shows a relationship between: a peak value of an electromagnetic wave intensity at each frequency; and a shifted amount of a zeta potential of a treatment-target water (potassium chloride water solution containing fine titanium oxide particles); measured by adopting the electromagnetic wave generator having the circuit shown in FIG. 4 or FIG. 5, in a manner to variously change a frequency within a frequency band of 10 Hz to 120 kHz.

It is noted that the modulated electromagnetic field treatment apparatus adopting the electromagnetic field generator shown in FIG. 5 is configured to: feed signals from OSC's, through dividers 31a, 31b for converting the signals into those at arbitrary frequencies, respectively, and through distributors 32a, 32b for distributing the respective signals into two lines, respectively, to an R-line generator 33a or S-line generator 33b, in an electrically multiplying manner; and thereafter output the resultant signals from electric-power amplifiers 34a, 34b to coil parts (not shown), respectively. At this time, it is possible to provide two lines of the same configuration as streams of signals, respectively, which can be selected as a synchronous type exemplarily configured to feed the signals from one distributor 32a to both the waveform generators 33a, 33b, or an asynchronous type configured to feed the signals from the distributors to the waveform generators 33a, 33b through independent lines (the upper section and lower section in FIG. 5), respectively. This apparatus is configured to intermittently flow, a modulated electromagnetic field signal obtained by multiplying a square wave by a sine wave, through the coil part.

As shown in FIG. 9, when the electromagnetic wave treatment is conducted in a frequency band preferably ranging from about 4 kHz to the vicinity of 25 kHz, the shifted amounts of zeta potential of a treatment-target water are largely changed, such that the shifted amounts are largely lowered and the zeta potentials show minus values, respectively, as compared to shifted amounts of zeta potential of a treatment-targeted water in case that the electromagnetic wave treatment is not conducted (in case of untreatment) or of a treatment-target water where peak values of electromagnetic wave intensities are seen in the other frequency band.

It is thus considered that, since the electromagnetic wave treatment of the edible oil or industrial oil in this embodiment is conducted in the above-described frequency band ranging from about 4 kHz to the vicinity of 25 kHz, fat/oil components contained in the edible oil or industrial oil are placed in a reductive environment, thereby restricting production of components tending to deteriorate the edible oil or industrial oil.

The procedure for measuring the zeta potential as shown in FIG. 9 is to be conducted according to the following items (1) to (4):

(1) Zeta potential measuring apparatus: Electrophoretic light scattering photometer ELS-800 manufactured by Ohtsuka Denshi K. K.

(2) Sample:
Solute: colloidal particles (particle diameter of 100 to 200 μm) of titanium oxide
Solvent: 10 mmol KCl water solution
Adjusting solution: pH5.5
Temperature: 25° C.

(3) Modulated Electromagnetic Wave Generator:
The electromagnetic wave generator shown in FIG. 4 or FIG. 5 was adopted, to exemplarily generate groups of electromagnetic waves, each group exhibiting the relationship between the applicable peak value of the electromagnetic wave intensity and the shifted amount of zeta potential of the treatment-targeted water as shown in FIG. 9, with a coil electric current of 1.0 ampere.

(4) Inserted into the interior space of the coil part 2 (a vinyl chloride piping having a coil wire wound therearound 20 turns) as shown in FIG. 10, was a beaker 24 containing the sample including the above-described particles, followed by a treatment for flowing an electric current of 1.0 ampere through the coil part 2 for 1 minute from the electromagnetic wave generator 10. Thereafter, the sample containing the particles in the beaker 24 was delivered from an outflow pipe 25 provided at a bottom portion of the beaker, into a zeta potential measuring apparatus 26, thereby measuring the zeta potential of the sample.

Measurements were conducted, by setting the main frequency of the electric current to be flowed through the coil, at 0, 5, 20, 40, 60, 80, . . . , and 120 kHz. Further, also in those cases where the electromagnetic wave treatment by the electromagnetic wave generator 10 or the like was not conducted, the sample containing the particles in the beaker 24 was delivered from the outflow pipe 25 provided at the bottom portion, into the zeta potential measuring apparatus 26, thereby measuring the zeta potential of the sample.

Shown in FIG. 9 are the relationships between the peak values of electromagnetic wave intensities at the respective frequencies and the shifted amounts of zeta potential of the treatment-targeted water as obtained by the above procedure, respectively, where each shifted amount of zeta potential was obtained relative to a zeta potential in case that the electromagnetic wave treatment was not conducted (upon untreatment) such that each shifted amount of zeta potential was an average value of measured values of 10 times.

Further, waveforms at the continuous frequencies to be generated by the electromagnetic wave generators shown in FIG. 4 and FIG. 5 are not limited to a square wave or sawtooth wave, and may each be a different waveform such as a sine wave, pulse wave, and the like.

While the present inventors have assumed that the zeta potential of an edible oil or industrial oil is made to be minus by virtue of this electromagnetic wave treatment to thereby prevent deterioration of the edible oil or industrial oil, the electromagnetic wave treatment was conducted for the edible oil or industrial oil in each of all the embodiments hereinafter, based on a flow of (a) an alternating current having a single frequency, (b) an alternating current having a plurality of single frequencies different from one another, or (c) an alternating current having a timewise varying frequency, unless otherwise specifically noted.

Embodiment 1

Listed in Table 1 and Table 2 are results of a colorimetric test for an edible oil, obtained by adopting the fluororesin-made casing 4 having the coil parts 2 hermetically sealed therein as shown in FIG. 1 and by flowing an alternating current of 20 milliamperes from the electromagnetic wave generator of FIG. 4 through the coil parts 2, in a manner to irradiate electromagnetic waves based on an alternating current having a timewise varying frequency between 4 kHz and 10 kHz in an amount of 1 hour/day, to a tank containing therein 10 milliliters of refined oil (shirashime-yu) as the edible oil.

It is noted that an acid value (AV) and a peroxide value (POV) each indicating a degree of oxidation of a fat/oil were adopted in the colorimetric test.

TABLE 1

Acid value (AV)

| | | 1st day | 2nd day | 3rd day | 4th day |
|---|---|---|---|---|---|
| Color Fresh oil | Blue 0 | Greenish blue 0.5 or less | same as the left 0.5 | same as the left 0.5 | same as the left 0.5 or less |
| Color Waste oil | Yellow 4 | Greenish blue 0.5 or less | same as the left 0.5 or less | same as the left 0.5 or less | same as the left 0.5 or less |

TABLE 2

Peroxide value (POV)

| | | 1st day | 2nd day | 3rd day | 4th day |
|---|---|---|---|---|---|
| Color Fresh oil | Pink 0 | Pink 10 or less | Pink 10 or less | Pink 10 or less | Pink 10 or less |
| Color Waste oil | Pink closer to violet 30 | Pink 30 | Pink 20 | Pink 20 | Pink 20 |

The acid value (AV) in Table 1 and the peroxide value (POV) in Table 2 are zeros, respectively, for a fresh oil.

Further, the waste oil shown in Table 1 and Table 2 is an oil having been heated at 170 to 180° C. for 1 hour.

The acid value (AV) can be visually judged by a test paper AV-CHECK (sold by: J-OIL MILLS, Inc.) for judging a deterioration degree of a heated oil, as follows:

0 (blue); 0.5 (greenish blue); 1.0 (bluish green); 2.0 (green); 3.0 (yellowish green); 4.0 (yellow)

Further, the peroxide value (POV) can also be visually judged by using a POV test paper (manufactured by Sibata Scientific Technology Ltd.), as follows:

0 (pink); 10 (deep pink); 30-50 (pink closer to violet)

Embodiment 2

In view of the results shown in Table 1, the coil part 2 shown in a perspective view of FIG. 11(a) and a longitudinal cross-sectional view of FIG. 11(b) was immersed in a tank containing therein 10 milliliters of "Daizu-yu Tappuri Salada-Yu (soybean-oil enriched salad oil)" (trade name) (manufactured by Ajinomoto Co., Inc.), and an alternating current of 20 milliamperes was flowed through the coil part 2 from the electromagnetic wave generator of FIG. 4, thereby treating the edible oil heated to 170° C., with electromagnetic waves based on the alternating current having a timewise varying frequency within a frequency band between 4 kHz and 10 kHz, for three weeks. Obtained results of colorimetric tests based on the AV and POV test papers for the edible oil, are indicated by numerical values and shown in FIG. 14(a) and FIG. 14(b), respectively. It was revealed that the AV value and the POV value were allowed to be kept at about 1.0 to 1.5, and about 5 to 15, respectively, as shown in FIG. 14. It was therefore seen from these values that the replacement time point of an edible oil to be exemplarily used for producing tempuras for business use was allowed to be prolonged about 3 times longer.

In this way, deterioration of the edible oil was scarcely seen over two weeks or longer, by virtue of the electromagnetic wave treatment of this embodiment. Further, it is assumed that, since the AV value of the edible oil can be kept at 1.0 to 1.5, the potentials of water and the oil are equalized by the electromagnetic wave treatment in a manner to promote divergence of the water from the oil, so that the water is removed from the tempura producing oil during production of tempura.

Here, the coil parts 2 of this embodiment shown in FIG. 11 and FIG. 13, respectively, will be described.

Figure 12:
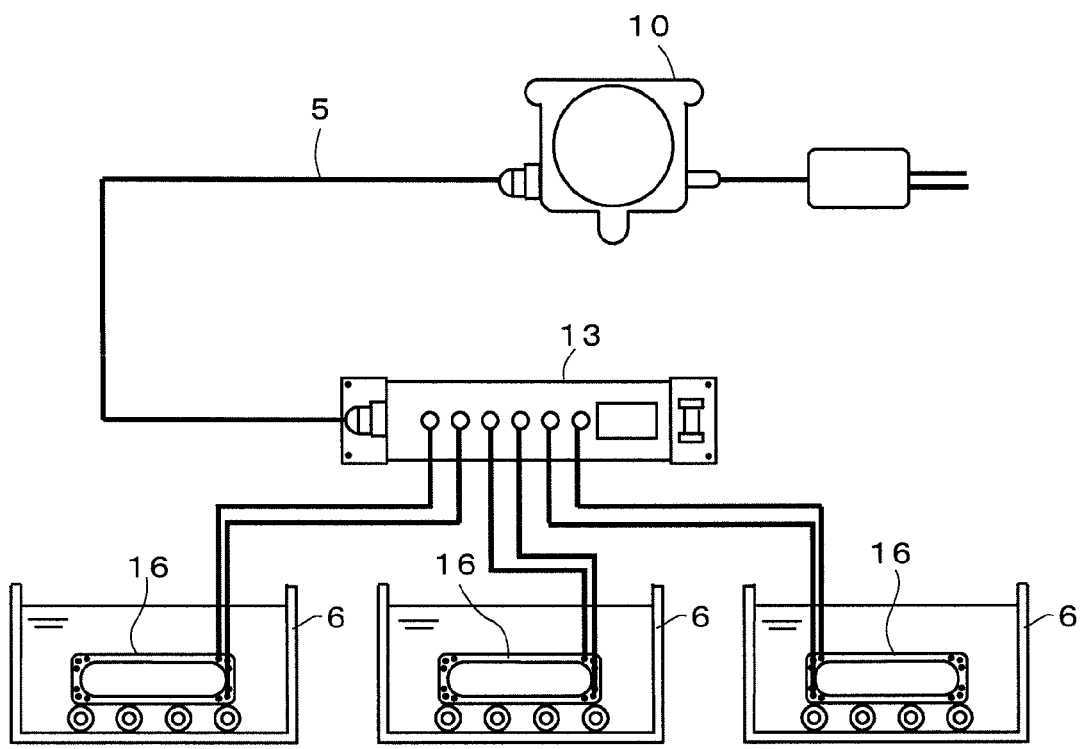
FIG. 12 is a constitutional view of an electromagnetic wave treatment apparatus adopting the coil part of FIG. 11.

(a) The applicable coil has a configuration as shown in a perspective view of FIG. 11(a) and a cross-sectional view of FIG. 11(b), where flange edges 11b, 11b are attached to both ends of a cylinder 11a, respectively, and a fluororesin-coated electric wire cable 5 is wound around a ring-shaped groove formed between the outer periphery of the cylinder 11a and the two flange edges 11b, 11b, thereby establishing oscillating units 16 each having the coil part 2 connected to the electromagnetic wave generator 10 through a relay unit 13 as shown in FIG. 12, in a manner to immerse the oscillating units 16 in an edible oil bath.

(b) It is possible to adopt such a technique (hereinafter called "oil watcher treatment" as the case may be) configured to: spirally wind a single fluororesin-coated long electric wire cable 5 ten and several times, and bundle the resultant winding into a coil part 2 in a ring shape as a whole; coat the whole of this ring-shaped matter with a fluororesin 17 except for both ends of the fluororesin-coated electric wire cable 5, to obtain the ring-shaped coil part 2, as shown in a perspective view of FIG. 13(b); and set the coil part 2 in an edible oil in an appropriate manner, and connect the both ends of the fluororesin-coated electric wire cable 5 to the electromagnetic wave generator 10, thereby irradiating electromagnetic waves to the edible oil.

Embodiment 3

When the fluororesin-made casing 4 having the coil parts 2 hermetically sealed therein of the embodiment 1 is immersed in a hot edible oil 7 over a long period of time, it is likely that the fluororesin is expanded such that an oil penetrates into those portions of the resin-made casing 4 where the coil parts 2 are hermetically sealed. As such, this embodiment adopts such a configuration to arrange a coil part in a tube made of stainless steel, instead of the fluororesin-made casing 4.

FIG. 15(*a*) shows an outside view of a concertina tube 12 made of stainless steel internally having a coil part (not shown) to be used in an embodiment of the electromagnetic wave treatment apparatus of the present invention. The concertina tube 12 internally provided with the coil part is to be fabricated in the following manner.

Wound onto a flexible rod (not shown) having a diameter smaller than an inner diameter of the concertina tube 12, is an electric wire cable (coated electric wire) 5 having a bent intermediate portion, in a manner to form a double coil; thereafter this assembly is inserted into the concertina tube 12 having one closed end, through an opening at an opposite proximal portion side; and the rod is drawn out of the concertina tube, thereby obtaining the concertina tube 12 internally having the coil part. Since end portions of the doubly wound electric wire cable 5 are left outside, these end portions are connected to terminals of both polarities of the electromagnetic wave generator 10, respectively.

The concertina tube 12 internally including the coil part is to be immersed in an edible oil 7 in an oil tank (fryer) 6 shown in a cross-sectional view of FIG. 15(*b*). Irrespectively of the shape of the oil tank 6, the concertina tube 12 made of stainless steel can be arranged along an inner wall of the tank and near a bottom wall surface thereof. Further, the end of the concertina tube 12 is closed, and the opening at the proximal portion side of the concertina tube 12 is arranged at a location significantly higher than the oil level of the oil tank 6, thereby bringing about no possibilities that the electric wire cable 5 is damaged by a hot oil. Moreover, the concertina tube 12 is never damaged even when the same is kept immersed in a hot oil over a long period of time, because the concertina tube is made of stainless steel.

According to the above configuration, electromagnetic waves are irradiated to an oil layer in the oil tank 6, from the coil part (not shown) in the concertina tube 12.

In this way, the electromagnetic wave treatment apparatus comprising the configuration shown in FIG. 15 is never damaged and is thus excellent in durability, because the electric wire cable 5 located in the hot edible oil 7 in the oil tank 6 is protected by the concertina tube 12 made of stainless steel.

Embodiment 4

This embodiment shown in FIG. 16 is configured to irradiate electromagnetic waves to an edible oil 7 in an oil tank 6 from coil parts 2 provided on flat plates 14 arranged outside the sidewalls of the oil tank 6, respectively, without immersing the coil parts 2 in the edible oil 7.

As shown in a side view of FIG. 16(*a*) of the coil part 2, a single electric wire cable 5 is adopted and wound into spiral shapes multiple times, to obtain spiral portions 5*a*, which are serially arranged and fixed onto each flat plate 14 such as a printed board, by means of a polyimide resin. It is possible to adopt such a configuration to arrange these flat plates 14 on opposite sidewall surfaces of the oil tank 6 as shown in a plan view of the oil tank 6 of FIG. 16(*a*), respectively, and to connect electrode cables 5 of the electromagnetic wave generator 10 to the ends of the electric wire cables 5, respectively, thereby establishing an electromagnetic wave treatment apparatus. In this case, electromagnetic waves are irradiated from coil parts 2 formed of the spiral portions 5*a* of the electric wire cables 5 outside the sidewalls of the oil tank 6, to the edible oil 7 in the oil tank 6, as shown in the plan view of the oil tank of FIG. 16(*b*). If one of the spiral portions 5*a* has a function for irradiating a sufficient amount of electromagnetic waves, it is possible to provide totally only one pair of spiral portions 5*a* on both sidewalls of the oil tank, respectively.

The electromagnetic wave treatment apparatus comprising the configuration shown in FIG. 16 is never directly contacted with the hot edible oil 7 in the oil tank 6, and is thus excellent in durability and usable for a long period of time.

Those results of colorimetric tests were the same as that in the embodiment 1, which results were obtained by adopting the electromagnetic wave treatment apparatuses comprising the configurations of FIG. 15 and FIG. 16, respectively, in a manner: to each flow an alternating current of 20 milliamperes through the applicable coil part 2 from the electromagnetic wave generator of FIG. 4 in case of adoption of a refined oil (shirashime-yu) as the edible oil 7; and to irradiate electromagnetic waves having a timewise varying frequency between 4 kHz and 25 kHz so that the zeta potential is made to be minus, to the edible oil, in an amount of 1 hour/day.

It is also possible to adopt such a configuration combiningly using the concertina tube type coil part shown in FIG. 15 and the flat plate type coil part 2 shown in FIG. 16.

Further, FIG. 17 shows an installation example of the coil part 2 of the electromagnetic wave treatment apparatus of the present invention, onto an oil tank 6 comprising a fryer apparatus capable of effectively irradiating electromagnetic waves to a tempura oil.

Shown in a perspective view of FIG. 17(*a*) is an exemplary configuration where an electric wire cable 5 is wound multiple times around an outer wall of the oil bath (oil tank) 6 of the fryer apparatus, thereby forming the coil part 2. Further, shown in a plan view of FIG. 17(*b*) is an exemplary configuration having the coil part 2 arranged horizontally such that the coil part is contacted with an inner wall of the oil bath (oil tank) 6.

Embodiment 5

"Temperature measurement of water-containing oil under temperature elevation"—influence of application of magnetic field—

The following experiment was conducted, to measure a temperature of a water-containing oil under temperature elevation, and to investigate an influence of application of magnetic field by this electromagnetic wave treatment apparatus (electromagnetic wave generator 10). Further, in this embodiment and embodiments 6, 7, 10, and 11, electromagnetic waves having frequencies and intensities shown in FIG. 20 were adopted for irradiation.

Introduced into an oil container 18 shown in FIG. 18 made of glass and having a height of about 5 cm, was an oil, which contained water emulsified therein, and the oil container was accommodated into a copper block 20 shown in FIG. 19 carrying thereon a coil part 2 provided by winding an electric wire cable 5 made of a copper wire, 30 times. The copper block 20 accommodating the oil container 18 therein was placed on an iron plate 21 placed on a gas range (not shown); an alumel-chromel thermocouple 22 was set in the oil container 18, and a mercury thermometer (not shown) was mounted in a thermocouple hole 20a of the copper block 20; and the copper block was heated by the gas range while turning ON this electromagnetic wave treatment apparatus (electromagnetic wave generator 10) by flowing an alternating current through the coil part 2 (or while keeping OFF the electromagnetic wave treatment apparatus). The electromotive force of the alumel-chromel thermocouple 22 by the temperature elevation of the edible oil in the oil container 18, was recorded by a recorder, and convertedly calculated as a temperature.

Most of heating devices to be used in laboratories rely on electroconduction to resistance wires, and particularly, those heating devices, which are easy to adjust temperatures, adopt resistance wires, respectively. However, in case of the apparatus shown in FIG. 19, heating by electrical resistance was duly avoided, because it was intended to investigate an effect of an inductive magnetic field to be generated by flowing a minute electric current through the coil part 2.

It was confirmed by the following experiment, that the electromagnetic wave treatment of the present invention caused such a phenomenon that smooth boiling of an edible oil upon production of tempura was started at a temperature, which was 10° C. lower than that in a case where the electromagnetic wave treatment was not conducted.

Shown in Table 3 are results in case that the electromagnetic wave treatment of the present invention was not conducted (untreatment), and the electromagnetic wave treatment ("oil watcher treatment") of the present invention was conducted at 180° C. and 170° C., in a situation where fried chickens were produced by adopting a canola/rapeseed oil manufactured by J-OIL MILLS, Inc.

TABLE 3

|  | Untreatment | Oil Watcher treatment | Oil Watcher treatment |
|---|---|---|---|
| Temperature | 180° C. | 180° C. | 180° C. |
| Time | 8 minutes | 8 minutes | 8 minutes |
| Color | Light brown | Black, carbonized | Light brown |
| Food feeling | Sticky food feeling | — | Crispy food feeling |

Whereas fried chickens completed in light brown at 180° C. in case of untreatment were sticky in food feeling, fried chickens identically completed in light brown were crispy in food feeling in case that the electromagnetic wave treatment ("oil watcher treatment") of the present invention was conducted at 170° C., which was lower than the above-described temperature by 10° C. In turn, when the electromagnetic wave treatment ("oil watcher treatment") of the present invention was conducted at 180° C., fried chickens were turned into black carbides, because the cooking temperature was too high.

Since it is typical that a reaction rate is doubled by a temperature elevation of 10° C. in a chemical reaction, it is resultingly expected that a rate of peroxide production in an edible oil is also decreased down to a half of the rate by a temperature lowering of 10° C. or more. It is considered that, since air is prevented from dissolving in an oil by virtue of bubbling therein during production of tempura, also the bubbles play an important role in the sense of preventing an oxidation reaction.

Shown in Table 4 and Table 5 are results of transitions of polar compound (TPM) values measured by a testo265 (manufactured by Edenki Inc.), in case that the electromagnetic wave treatment of this embodiment was duly conducted for a refined oil (shirashime-yu) manufactured by J-OIL MILLS, Inc.

TABLE 4

|  | Number of operated days | | | | | |
|---|---|---|---|---|---|---|
|  | 1 day | 2 days | 3 days | 4 days | 5 days | 6 days |
| TPM value (%) | 11 | 12 | 12 | 12 | 14.5 | 14.5 |
| Added/replaced oil amount (1) | 0 | 80 | 20 | 20 | 60 | 40 |

|  | Number of operated days | | | | | |
|---|---|---|---|---|---|---|
|  | 7 days | 8 days | 9 days | 10 days | 11 days | 12 days |
| TPM value (%) | 15 | 18 | 15.5 | 16 | 15.5 | 19 |
| Added/replaced oil amount (1) | 40 | 40 | 40 | 80 | 0 | 0 |

TABLE 5

|  | Number of operated days | | | | | | | | |
|---|---|---|---|---|---|---|---|---|---|
|  | 1 day | 2 days | 3 days | 4 days | 5 days | 6 days | 7 days | 8 days | 9 days |
| TMP value (%) | 9.5 | 10.5 | 11 | 6.5 | 10 | 10 | 10.5 | 10.5 | 13 |
| Added/replaced oil amount (liter) | 0 | 40 | 0 | 0 | 0 | 0 | 0 | 60 | 40 |
|  | Oil watcher (OW)-inexecution | | | | | Oil watcher (OW)-operated | | | |

|  | Number of operated days | | | | | | | |
|---|---|---|---|---|---|---|---|---|
|  | 10 days | 11 days | 12 days | 13 days | 14 days | 15 days | 16 days | 17 days |
| TMP value (%) | 14 | 14 | 16 | 15 | 17 | 17.5 | 18.5 | 20 |
| Added/replaced oil amount (liter) | 40 | 0 | 0 | 0 | 40 | 0 | 40 | 0 |
|  | Oil watcher (OW)-operated | | | | | | | |

Figure 21:
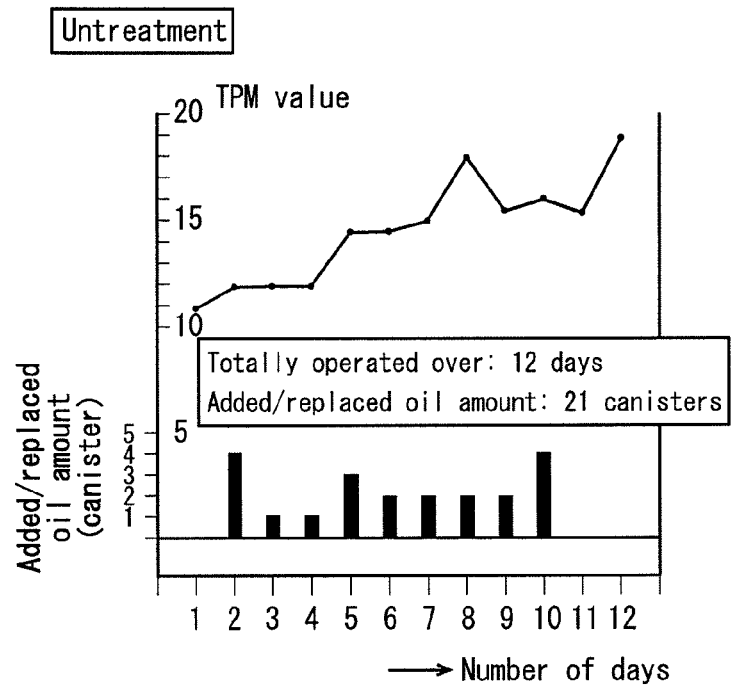
FIG. 21 is a graph of a transition of concentration of a polar compound in an edible oil used in case that the electromagnetic wave treatment of the present invention is not conducted, for comparison in the embodiment 5.

As listed in Table 4 and shown in a graph of FIG. 21, investigated was a transition of a polar compound in a refined oil (shirashime-yu), in a manner to appropriately add an amount of refined oil (shirashime-yu) from a canister of 20 liters into 400 liters of refined oil (shirashime-yu) contained in a tank and during production of tempura, in case that the electromagnetic wave treatment ("oil watcher treatment") of the present invention was not conducted.

As apparent from Table 4 and the graph of FIG. 21, it is understood that the concentration of polar compound (TPM) was increased as the number of operated days was increased, even when a new oil was added.

Figure 22:
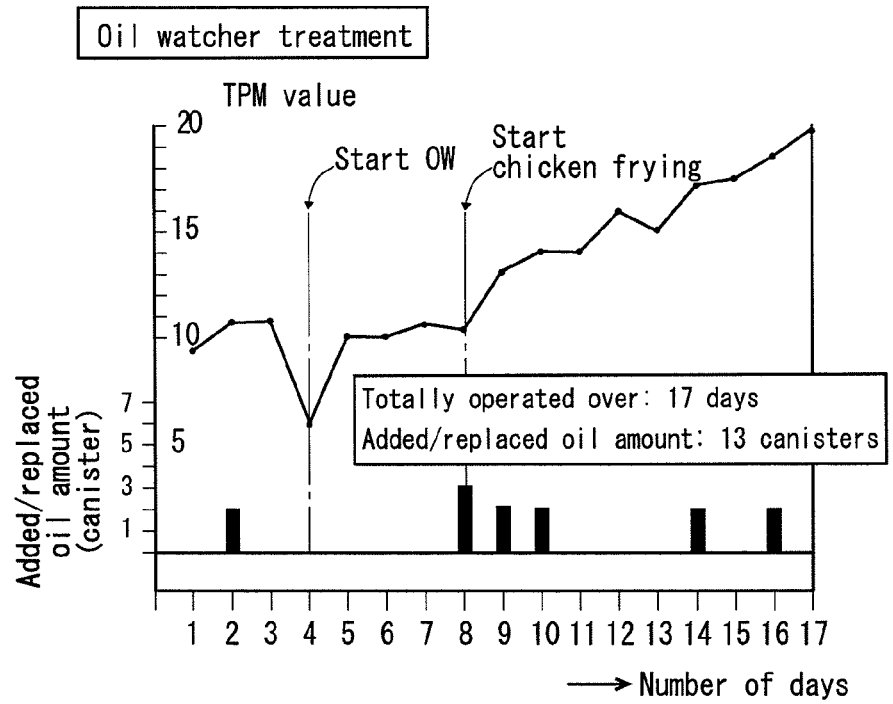
FIG. 22 is a graph of a transition of concentration of a polar compound in an edible oil used in case that the electromagnetic wave treatment of the present invention is conducted, in the embodiment 5.

Further, as listed in Table 5 and shown in a graph of FIG. 22, investigated were: a transition of a polar compound in a refined oil (shirashime-yu), in a manner to appropriately add an amount of refined oil (shirashime-yu) from a canister of 20 liters into 400 liters of refined oil (shirashime-yu) contained in a tank and during production of tempura, in case that the electromagnetic wave treatment ("oil watcher treatment") of the present invention was not conducted, for a certain period of time, i.e., for first three days; and a transition of a polar compound in the refined oil (shirashime-yu), in a manner to appropriately add an amount of refined oil (shirashime-yu) from the canister of 20 liters into 400 liters of refined oil (shirashime-yu) contained in the tank and during production of tempura, in case that the electromagnetic wave treatment ("oil watcher treatment") of the present invention was subsequently conducted. As apparent from Table 4 and FIG. 21, it was required to use a fresh edible oil for cooking and to frequently add a new oil into the edible oil, in case that the electromagnetic wave treatment ("oil watcher treatment") of the present invention was not conducted. It is suggested from Table 4 and FIG. 21 that the TPM value would have been largely increased, unless the fresh edible oil were added.

In turn, as seen from Table 5 and FIG. 22, although the TPM value was not lowered even by addition of a fresh refined oil (shirashime-yu) in an amount of two canisters into 400 liters of refined oil (shirashime-yu) in the tank during production of tempura when the oil watcher treatment was not conducted for first three days, the TPM value never rose even after a subsequent lapse of five days without appropriately adding a refined oil (shirashime-yu) from the canister of 20 liters when the electromagnetic wave treatment ("oil watcher treatment") of the present invention was conducted during production of tempura. Only, the TPM value exhibited a tendency to rise, because production of fried chickens was subsequently conducted, upon collecting this data. It is noted that, the reason why those edible oils, which have relatively progressed in deterioration, are typically used for producing fried chickens, is that the number of bits of fried batter is known to be increased during production of fried chickens such that a large amount of polar compounds such as oxides are produced from sediments of the bits.

It is considered that a batter of tempura is swung by the oil watcher treatment in a manner to help the water to be vaporized, and that, since progression of tempura cooking is estimated based on a state of bubbling, bubbling substantially at the same degree as the usual is brought about at a temperature lower than a usual cooking temperature by 10° C. or more when the oil watcher treatment is conducted.

One of factors of deterioration is that oxygen in the air is added to an unsaturated bond(s) in each molecule of an edible oil, and it is assumed that the applicable molecule is firstly turned into a peroxide (which is to be measured as a POV) and is then turned into a carbonyl compound (which is to be measured as a CV), thereby bringing about a cause of a burnt oil odor. It is thus assumed that tempuras can be produced at a temperature lower than the usual by 10° C. or more by virtue of the oil watcher treatment, and oxidation of an edible oil can be restricted as exemplified in FIG. 14, while obtaining such an effect not to deteriorate a delicious taste of tempura.

Embodiment 6

"Influence of application of magnetic field on evaporation of water from water-containing oil"

Since such a fact has been found out in the experiment of "Temperature measurement of water-containing oil under temperature elevation" of the embodiment 5 that boiling of water is made to be steady by virtue of the electromagnetic wave treatment ("oil watcher treatment") of the present invention, it is considered that the alternatingly varying magnetic field applied by this electromagnetic wave treatment helps boiling of water. As such, each of two glass-made reagent bottles of 20 mL volume was subjected to introduction of 9.9 mL of edible oil and 0.1 mL of water thereinto, and then subjected to emulsification by a vortex and ultrasonic waves, followed by precise weighing of the respective weights.

It is noted that the edible oil used in the experiment of this embodiment 6 was "Daizu-yu Tappuri Salada-Yu (soybean-oil enriched salad oil)" (trade name) manufactured by Ajinomoto Co., and "ECONA" (trade name) manufactured by Kao Corporation was used as diacylglyceride.

Figure 23:
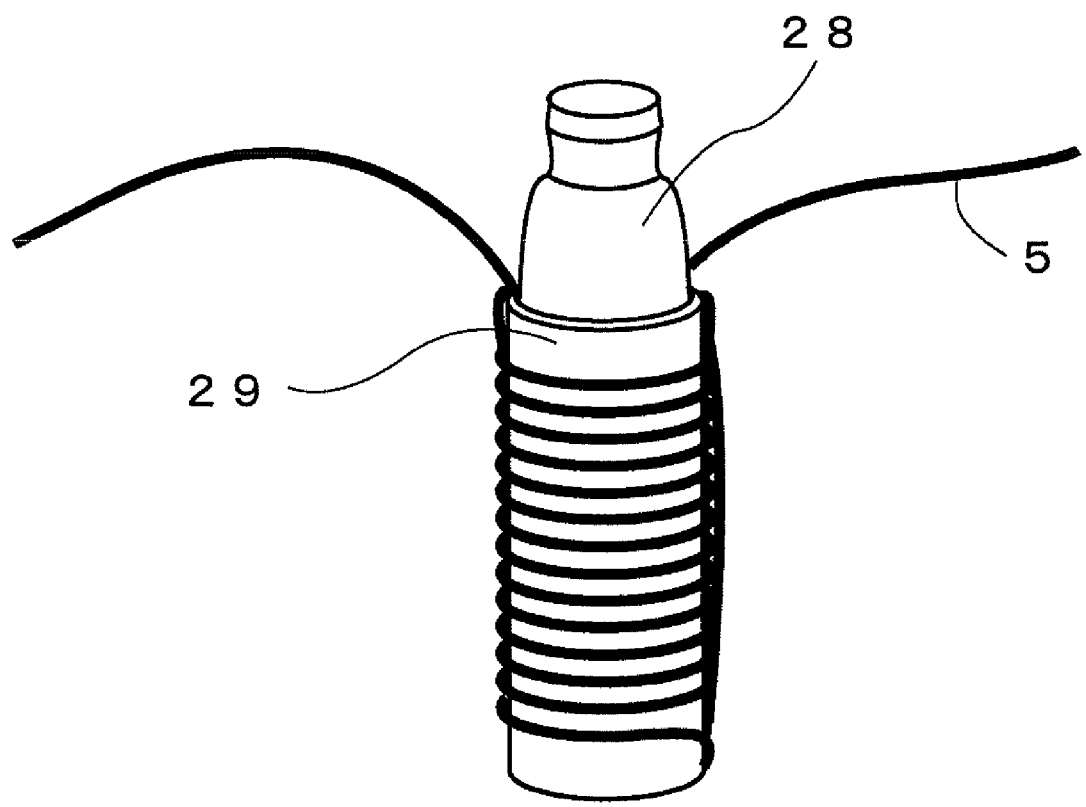
FIG. 23 is a perspective view of an apparatus used in an embodiment 6 and for conducting an electromagnetic wave treatment of the present invention.

In turn, introduced into a beaker of 500 mL volume (not shown) was a silicone oil, the beaker was placed on an iron plate arranged on a gas range, and the beaker was heated thereby in a manner to adjust the flame to heat the beaker to 120° C. One of the two sample bottles was suspended by a thin copper wire such that the sample bottle was immersed in the silicone oil in the beaker (not shown). The remaining one sample bottle 28 was accommodated into a brass pipe 29 having an electric wire cable 5 wound thereon and comprising a copper wire coated with a fluororesin as shown in FIG. 23, thereafter an electromagnetic wave treatment ("oil watcher treatment") was conducted for irradiating electromagnetic waves having frequencies and intensities shown in FIG. 20, and then the sample bottle was similarly suspended in the beaker. Heating was conducted for 30 minutes in this state, and then the sample bottles 28 were pulled up.

The bottles 28 were then left to be cooled down to a room temperature, and the outer walls thereof were carefully wiped, followed by precise weighing. Observed loss weights (g) are summarized in Table 6. Since the edible oil is substantially nonvolatile, the observed loss weights were to be caused by evaporation of water. In this respect, it was confirmed that no loss weights were caused, even by heating the edible oil under the same conditions as the above, without adding any water thereinto.

TABLE 6

| Sample | Presence/absence of application of magnetic field | Experiment 1 | Experiment 2 | Experiment 3 | Experiment 4 |
|---|---|---|---|---|---|
| Edible oil | Without OW | 0.0209 g | 0.0585 g | 0.0616 g | |
| | OW application | 0.0796 g | 0.0716 g | 0.0858 g | |
| DG 10% a) | Without OW | 0.0237 g | 0.0421 g | 0.0367 g | 0.0400 g |
| | OW application | 0.0782 g | 0.0819 g | 0.0890 g | 0.0882 g |
| OL 10% b) | Without OW | 0.0290 g | 0.0288 g | 0.0605 g | 0.0207 g |
| | OW application | 0.0714 g | 0.0717 g | 0.0849 g | 0.0735 g |
| DG 5%, OL 5% c) | Without OW | 0.0336 g | 0.0337 g | 0.0503 g | 0.0244 g |
| | OW application | 0.0782 g | 0.0784 g | 0.0787 g | 0.0660 g | a) diacylglyceride 10% + edible oil 90%
b) oleic acid 10% + edible oil 90%
c) diacylglyceride 5% + oleic acid 5% + edible oil 90%

It is noted that the mark "OW" in Table 6 indicates the oil watcher treatment of the present invention.

The same experiments were also conducted for mixtures obtained by mixing 10% diacylglyceride, 10% oleic acid, and 5% diacylglyceride and 5% oleic acid into the edible oils, respectively. The loss weight results are listed in Table 6. Since the edible oil is substantially nonvolatile, the observed loss weights were to be caused by evaporation of water.

In this respect, it was confirmed that no loss weights were caused, even by heating the edible oil under the same conditions as the above, without adding any water thereinto. In all the experiments conducted 13 times, the evaporation amount of water was increased by 130 to 300% by virtue of application of the alternatingly varying magnetic field as compared to a case without application of magnetic field, thereby revealing that the evaporation amount of water was allowed to be remarkably increased.

Here, it was noticed that the evaporating effect had been likely to be promoted when the bottle 28 had been contacted with a wall of the beaker, so that an experiment was conducted for confirming it. Namely, four bottles 28 were prepared each containing therein 100 mg of edible oil, which contained water emulsified therein, and were arranged in beakers 30 containing therein silicone oils as shown in FIG. 24 in a manner to be heated to 120° C. for 30 minutes, respectively. In FIG. 24, the sample 1 shown in FIG. 24(a) and the sample 2 shown in FIG. 24(b) were both suspended from the above, such that each sample was accommodated in the brass pipe 29 as shown in FIG. 23 having a coil (not shown) wound thereon, and the sample 1 was subjected to execution of an oil watcher treatment and the sample 2 was not. The sample 3 shown FIG. 24(c) and the sample 4 shown in FIG. 24(d) were such bottles 28 without using brass pipes 29, respectively, and the sample 3 was suspended and only the sample 4 was placed on the bottom portion of the beaker 30. The obtained results are summarized in Table 7.

TABLE 7

| Arrangement manner of sample bottle | | Experiment 1 | Experiment 2 |
|---|---|---|---|
| Sample 1 | OW application | Suspended | 0.0741 g | 0.0734 g |
| Sample 2 | Without OW | Suspended | 0.0230 g | 0.0205 g |
| Sample 3 | Without OW | Suspended | 0.0244 g | 0.0240 g |
| Sample 4 | Without OW | On Bottom | 0.0664 g | 0.0658 g |

While it has been confirmed from Table 7 that the evaporating effect of water was enhanced in case that the applicable bottle 28 was contacted with the bottom wall of the beaker 30 as compared to the cases that the bottles 28 were suspended, it has also been confirmed that the evaporation amount of water was increased by about one tenth to three tenths than the contacted case, as an effect obtained by executing the oil watcher treatment when the applicable bottle 28 was suspended.

In this way, it is suggested that the electromagnetic wave treatment of the present invention helps water to boil.

Embodiment 7

Shown in a perspective view of FIG. 25(a) is an example where a plate 36 coated with a far-infrared ceramic is installed in an oil tank 6 of a fryer apparatus manufactured by SAMY Co., Ltd., upon conduction of the electromagnetic wave treatment (oil watcher) of the present invention.

Adopted as an edible oil was a rapeseed oil made in Canada, thereby frying those foods to be fried such as meats, fishes, vegetables, and the like externally coated with bread crumbs.

The plate (metal net) 36 coated with the far-infrared ceramic (containing, as main components, a naturally radioactive rare earth mineral and a mineral emitting far-infrared rays at an ordinary temperature, including 47±2% of zirconium oxide, 27±2% of silicon oxide, and 5% of alumina) was immersedly installed in the edible oil 7 of the oil tank 6 of the fryer apparatus; an electric wire cable 5 was wound multiple times around an outer wall (which is shown in the figure to allow to see the interior through the outer wall) of the oil tank 6 to thereby form a coil part 2; and another electric wire cable was wound to contact with an inner wall of the oil tank 6 to thereby form another coil part (not shown) (see FIG. 17).

To be flowed through the coil parts 2 are alternating currents each having a timewise varying frequency (4 kHz to 25 kHz), at 4 W and a voltage of 100V or 200V (±20%), thereby irradiating electromagnetic waves to the edible oil 7.

Since fried foods were to be scorched by cooking thereof at 175° C. in case of irradiating electromagnetic waves based on such an alternating current having a plurality of single frequencies different from one another from 4 kHz to 25 kHz as shown in FIG. 8 by the electromagnetic wave generator of the present invention, fried foods were produced at an oil temperature from 170° C. to 165° C.

Shown in FIG. 25(b) is a transition of an AV value of the oil in relation to the number of lapsed days. It is noted that each AV value was a test result by a test paper.

As seen from the results of FIG. 25(b), an effect of combined usage is apparently obtained in case that the electromagnetic wave treatment (oil watcher: OW) of the present invention is combinedly used with a far-infrared ceramic coat treatment (IR), as compared to the case of only the oil watcher (OW) and the case of only the far-infrared ceramic coat treatment (IR); and an energy-saving effect is also seen when the oil temperature was set not at 170° C. but at 165° C. because the completed degree of fried food in the latter case was never inferior to that in case of frying at 170° C., in a manner to allow for production of fried foods at the lower temperature. Further, no odors were caused even when a replacement time point of the oil had come, and no substances were attached to the wall surface of the fryer, thereby also revealing a presence of purifying effect, which was considered to be an effect of the oil watcher treatment.

Embodiment 8

Figure 26:
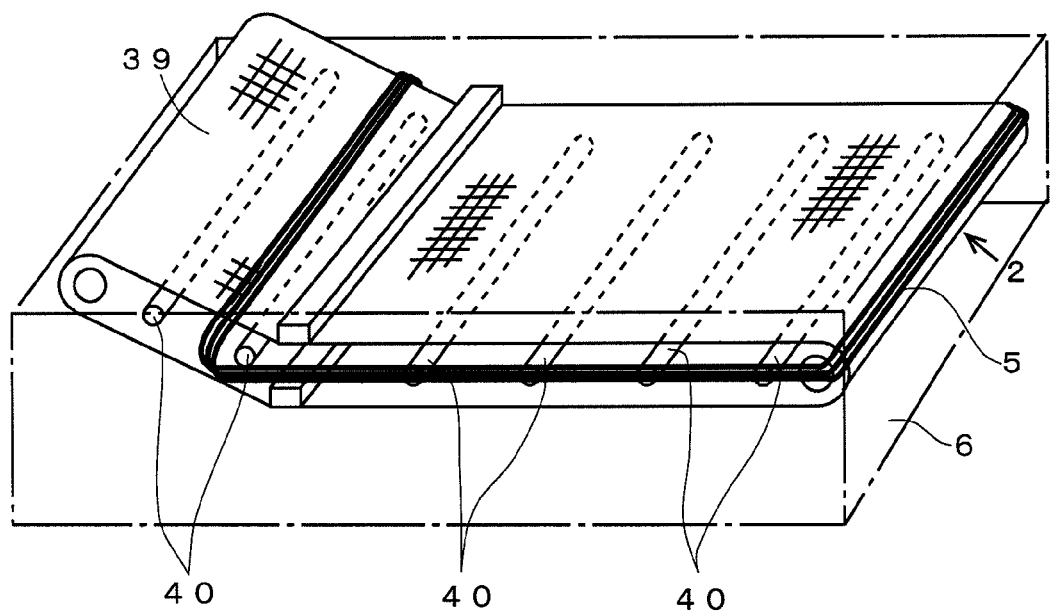
FIG. 26 is a perspective view of an example where a coil part of an electromagnetic wave treatment apparatus according to the present invention used in an embodiment 8 is actually applied to a fryer apparatus for continuously producing pork cutlets.

Shown in a perspective view of FIG. 26 is an example where the electromagnetic wave treatment (oil watcher) according to the present invention and a heat treatment by a far-infrared heater 40 are applied to an oil tank 6 of a fryer apparatus for continuously producing pork cutlets.

The oil tank 6 of the fryer apparatus was a type of model number IDN-W15-L (15 kw) manufactured by IDEN Co., Ltd., in a manner to establish an apparatus configured to install an endless belt conveyor type metal net 39 in an oil of the oil tank 6 and to fry those foods while they were conveyed on the belt conveyor type metal net 39; where an electric wire cable 5 was wound around an outer wall of the oil tank 6 to thereby form a coil part 2, and multiple far-infrared heaters 40 were parallelly arranged in the belt conveying course in the metal net 39.

The far-infrared heaters 40 provided outputs of wavelengths of 2.2 to 8 μm at 300 to 2,000 mA and 100V; and electromagnetic waves based on an alternating current having a timewise varying frequency between 4 kHz and 25 kHz as shown in FIG. 7, were applied from the coil part 2 to a tempura oil (canola/rapeseed oil manufactured by The Nisshin OilliO Group, Ltd.) in the oil bath, by the electromagnetic wave generator (not shown) of the present invention.

Although frying was conducted at temperatures of 166 to 170° C. in case of producing tempuras while conducting the irradiation of electromagnetic waves of 4 kHz to 25 kHz by the electromagnetic wave generator of the present invention, pork cutlets were fried at temperatures of 160° C. in this embodiment because completed products were scorched at the previous higher temperatures, which phenomenon was considered to be caused by virtue of combined usage of the far-infrared heaters 40.

Moreover, electromagnetic waves of 4 kHz to 25 kHz were irradiated at approximately 160° C. Thus, although the AV value had previously reached a limit value (AV=3) only after four days, the AV value of the oil had firstly reached the limit value of the AV value after usage of the oil for 6 days because the electromagnetic waves of 4 kHz to 25 kHz were irradiated from the coil part together with the heating by the far-infrared heaters 40.

The completed pork cutlets were perfectly improved in fried state as compared to those conventional ones, and were so crispy in completed states.

Further, contamination of the wall surface of the oil tank 6 was relatively less, and contamination of the metal net 39 of the belt conveyor was so improved to a visually recognizable degree.

Embodiment 9

Conducted was an experiment for confirming an effect by an oil watcher treatment upon producing croquettes. Namely, croquettes were friedly obtained by introducing "Hashed Potato" (product name) produced by IGARASHI REIZO Co., Ltd., into "Nisshin Salad Oil" manufactured by The Nisshin OilliO Group, Ltd., in an oil bath of ANALOR BATH E0-200 (100V AC) manufactured by AS ONE Corporation, in a manner to immerse the coil part 2 shown in FIG. 11 in the oil and to flow an alternating current oscillating at a single frequency through the coil part 2. In all the cases, the oil temperature was kept constant at 170° C., and heating was conducted for 4 minutes.

Shown below are a case where the oil watcher treatment was not conducted (untreatment), and cases where the oil watcher treatments were conducted by oscillatingly generating single frequencies comprising single sine waves of 1 kHz, 4 kHz, 5 kHz, 8 kHz, 10 kHz, 15 kHz, 20 kHz, 25 kHz, 25.8 kHz, and 30 kHz, respectively, as shown in FIG. 6.

Measured were: a difference between a weight of each croquette before frying and a weight thereof after frying for 4 minutes; and a time lapsed until the croquette was floated up to an upper surface of the oil during the frying for 4 minutes; and the weight decreased ratio was calculated.

As seen from the results listed in Table 8, although about 3.0 minutes were required until the applicable croquette was floated up to the upper surface of the oil in each case of electromagnetic wave treatments of 1 kHz, 25.8 kHz, and 30 kHz, only 2.3 to 2.45 minutes were required in other cases of electromagnetic wave treatments between 4 kHz to 25 kHz. It is noted that no differences were found between sine waves and sawtooth waves for waveforms of electromagnetic waves.

TABLE 8

| Frequency (Hz) | Weight Measurement 1 | Weight Measurement 2 | Time up to floating | Decreased ratio (%) |
| --- | --- | --- | --- | --- |
| Untreatment | 63.3 | 56.7 | 3 min 00 sec | 10.3 |
|  | 65.8 | 58.6 | 3 min 00 sec | 11.0 |
| 1000 | 65.6 | 58.9 | 3 min 00 sec | 10.2 |
|  | 64.2 | 57.2 | 3 min 00 sec | 11.0 |
| 4000 | 66.8 | 57.7 | 2 min 40 sec | 13.5 |
|  | 69.8 | 59.6 | 2 min 35 sec | 15.0 |
| 5000 | 65.6 | 54.8 | 2 min 30 sec | 16.5 |
|  | 63.9 | 55.3 | 2 min 30 sec | 13.3 |
| 8000 | 67.2 | 57.5 | 2 min 30 sec | 14.5 |
|  | 65.2 | 55.5 | 2 min 30 sec | 14.9 |
| 10000 | 65.3 | 56.0 | 2 min 30 sec | 14.2 |
|  | 62.2 | 52.1 | 2 min 15 sec | 16.1 |
| 15000 | 65.2 | 56.6 | 2 min 15 sec | 13.1 |
|  | 68.4 | 58.9 | 3 min 10 sec | 13.9 |
| 20000 | 67.4 | 59.5 | 2 min 45 sec | 11.8 |
|  | 65.4 | 56.9 | 2 min 30 sec | 12.9 |
| 25000 | 64.5 | 56.7 | 2 min 35 sec | 12.0 |
|  | 69.0 | 61.1 | 2 min 50 sec | 11.4 |
| 25800 | 66.5 | 57.7 | 3 min 00 sec | 13.2 |
|  | 70.5 | 60.9 | 2 min 45 sec | 13.6 |
| 30000 | 63.9 | 57.4 | 3 min 00 sec | 10.1 |
|  | 67.4 | 60.5 | 3 min 10 sec | 10.2 |

As shown in FIG. 9, the differences of times until floating of croquettes are considered to be due to such a difference that those electromagnetic wave treatments at 1 kHz, 25.8 kHz, and 30 kHz were hardly regarded as reductive (−) treatments, respectively, whereas those electromagnetic wave treatments between 4 kHz to 25 kHz were reductive (−) treatments, respectively. Further, in cases where the electromagnetic wave treatments were conducted between 4 kHz to 25 kHz, the croquettes were each completed in a crispy state, thereby allowing for obtainment of croquettes excellent in food feeling.

According to the above results, conduction of reductive (−) treatments by electromagnetic waves between 4 kHz to 25 kHz promoted completion of croquettes as compared to untreatment, without stickiness of the fried foods and with remarkably improved food feeling thereof.

Embodiment 10

It has been proven that the electromagnetic wave treatment (oil watcher treatment) for irradiating electromagnetic waves having frequencies and intensities shown in FIG. 20 upon production of tempuras by adopting "Daizu-yu Tappuri Salada-Yu (soybean-oil enriched salad oil)" (trade name) manufactured by Ajinomoto Co., brought about an effect for preventing attachment of carbides onto or an effect for peeling carbides from that portion of a wall surface of an oil tank acting as a cooking apparatus (fryer), which portion was contacted with the edible oil.

As seen in a photograph of a part of the fryer having been used for about a year as shown in FIG. 27(*c*), contaminants assumed to comprise carbides had attached to a wall surface of a heating member. However, FIG. 27(*b*) and FIG. 27(*a*) show photographs of the same member part of the fryer used for production of tempura over 1 month and 2 months at 170° C. while conducting the oil watcher treatments during the production of tempura, respectively.

In this way, when the oil watcher treatment was conducted during production of tempura, contaminants of the fryer were started to leave therefrom after one month, and attached substances on the wall surface of the fryer were allowed to be peeled therefrom by a simple cleaning to thereby expose a metal surface of the fryer.

Embodiment 11

"Sunoco motor oil OW-2" (trademark of Japan Sun Oil Company, Ltd.) to be used as a paraffin-based motor oil is produced by repetitively claytreating an oil, which is obtained from a crude oil before purification and which contains removal target substances. The removal target substances contained in the oil include a lot of acidic substances containing sulfur, nitrogen, and the like, so that the operation for purifyingly treating it into a motor oil as the "Sunoco motor oil OW-2" is made to be a considerable burden.

Conducted was an experiment in the following procedure, so as to study presence or absence of an effect of the electromagnetic wave treatment configured to irradiate electromagnetic waves having frequencies and intensities shown in FIG. 20 to the oil, which is a source material for producing this "Sunoco motor oil OW-2" (trademark of Japan Sun Oil Company, Ltd.) and which contains removal target substances.

150 mL of the oil containing the removal target substances was introduced into a beaker having a volume of 300 mL; a clay in an amount of 1 wt % or 5 wt % of the oil and having a density of 0.9 was delivered into the oil; and the oil was heated to 110 to 120° C. for 20 minutes while stirring it. Applied to this oil containing the removal target substances and in the heated state, was an oil watcher treatment at an arbitrary electric charge for 20 minutes, at the frequency shown in FIG. 7, by a fluororesin-coated electric wire cable, which was wound 11 times around a wall surface of the beaker; followed by further delivery of the clay into the oil, and by stirring.

Used as the clay was a type SA1 of Nippon Activated Clay Co., Ltd.

In case of flowing an alternating current according to either of (a) an oil watcher treatment (reductive (−) treatment) based on a frequency between 4 kHz to 25 kHz, or (b) an oil watcher treatment (oxidative (+) treatment) based on a frequency except for 4 kHz to 25 kHz, the oil was subjected to application of the applicable electric charge before introducing the clay into the oil; and in case of applying both the reductive (−) treatment (a) and the oxidative (+) treatment (b) to the oil, the clay was introduced into the oil after applying either electric charge of (+) or (−) at the first time, and then the other electric charge of (−) or (+) at the second time was applied to the oil.

After each oil watcher treatment, an oil in an amount required for analysis was collected by a filter paper, and subjected to conduction of a neutralization number test according to JIS-2501 by KOH.

The neutralization number test was as follows. It is noted that the situation where the oil watcher treatment was not executed is represented as "OW-inexecution".

(1) The amount of KOH was 5.5 g, which was required for neutralizing 100 mL of the oil before purification by clay.

(2) Amounts of KOH required for neutralizing 100 mL of oil after 1 wt % clay treatment were 3.6 g, 3.2 g, 3.7 g, and 3.5 g for the cases of the OW-inexecution, the reductive (−) treatment (a), the oxidative (+) treatment (b), and the oxidative (+) treatment (b) and the reductive (−) treatment (a) thereafter, respectively.

(3) Amounts of KOH required for neutralizing 100 mL of oil after 5 wt % clay treatment were 1.1 g, 0.66 g, 1.38 g, and 0.9 g for the cases of the OW-inexecution, the reductive (−) treatment (a), the oxidative (+) treatment (b), and the oxidative (+) treatment (b) and the reductive (−) treatment (a) thereafter, respectively.

Since the required amount of KOH is proportional to a residual amount of acidic removal target substances in the oil, the residual ratio of removal target substances is represented by the following equation:

$$100 \times [(1) - \{(1)-(2)\}/(1)], \text{ or}$$

$$100 \times [(1) - \{(1)-(3)\}/(1)].$$

The results listed in Table 9 were obtained by this embodiment.

TABLE 9

|  | (g) | (g) | (clay 1 wt %) | (clay 5 wt %) |
|---|---|---|---|---|
| OW-inexecution | 3.6 | 1.1 | 65 | 20 |
| Reductive (−) treatment | 3.2 | 0.6 | 58(−7) | 12(−8) |
| Oxidative (+) treatment | 3.7 | 1.3 | 68(+3) | 25(+5) |
| Oxidative (+) treatment, and reductive (−) treatment thereafter | 3.5 | 0.9 | 63(−2) | 17(−3) |

It is seen that the residual amount of acidic removal target substances was decreased by about 10% by conducting the oil watcher treatment of the reductive (−) type, for the lubricating oil as well, as shown in Table 9.

Embodiment 12

As to what kind of influence is seen for the clay in the embodiment 11 in case of adopting the clay and conducting the oil watcher treatment for a refined oil (shirashime-yu) produced by J-OIL MILLS, Inc., a transition of a polar compound (TPM) value in the refined oil (shirashime-yu) was measured by a testo265 (manufactured by Edenki Inc.) for consideration.

This embodiment was conducted by adopting the electromagnetic wave generator shown in FIG. 5, which was oscillated at a frequency of the type shown in FIG. 8 within a range of 6 to 22 kHz.

(1) The TPM value of the refined oil (shirashime-yu) without subjected to oil watcher treatment, was 24.0.

(2) The untreated refined oil (shirashime-yu) was heated to 100° C., and 2 wt % of clay was delivered thereinto, followed by stirring for 15 minutes and by subsequent collection of a sample therefrom.

(3) The untreated refined oil (shirashime-yu) was heated to 100° C., the OW treatment of the reductive (−) type at an output of 5 watts was subsequently conducted for 10 minutes, the OW treatment was stopped then, and 2 wt % of clay was delivered into the oil, followed by stirring for minutes and by subsequent collection of a sample therefrom.

(4) The untreated refined oil (shirashime-yu) was heated to 100° C., the OW treatment of the oxidative (+) type at an output of 5 watts was subsequently conducted for 10 minutes, the OW treatment was stopped then, and 2 wt % of clay was delivered into the oil, followed by stirring for minutes and by subsequent collection of a sample therefrom.

(5) The untreated refined oil (shirashime-yu) was heated to 100° C., the OW treatment of the reductive (−) type at an output of 5 watts was subsequently conducted for 10 minutes, and 2 wt % of clay was thereafter delivered into the oil while conducting the OW treatment of the oxidative (+) type, followed by stirring for 15 minutes and by subsequent collection of a sample therefrom.

(6) The OW treatment in the item (3) was conducted at an output of 15 watts.

(7) The OW treatment in the item (4) was conducted at an output of 15 watts.

(8) The OW treatment in the item (5) was conducted at an output of 15 watts.

(9) The untreated refined oil (shirashime-yu) was heated to 100° C., and 2 wt % of clay was delivered into the oil while continuing the OW treatment of the reductive (−) type at an output of 15 watts, followed by stirring thereafter and by collection of a sample after 30 minutes.

(10) The untreated refined oil (shirashime-yu) was heated to 100° C., and 2 wt % of clay was delivered into the oil while continuing the OW treatment of the oxidative (+) type at an output of 15 watts, followed by stirring thereafter and by collection of a sample after 30 minutes.

Results of the above tests:

The TPM values in the tests of (1), (4), (5), (7), (8), and (10) were each 24.0.

The TPM value in the test of (2) was 25.5.

The TPM values in the tests of (3), (6), and (9) were each 23.5.

In this way, it was proven that production of acidic components was restricted by conducting both the oil watcher treatment of the reductive (−) type and the clay treatment for a refined oil (shirashime-yu).

According to the present invention, it is possible to prevent deterioration of an edible oil or industrial oil while using it, in a manner to highly possibly and remarkably contribute to saving resources, and it is probable that the electromagnetic wave treatment technique of the present invention is also applicable to mineral oils and the like, without limited to edible oils.

| | |
|---|---|
| 2: | coil part |
| 3: | rod |
| 4: | fluororesin casing |
| 5: | electric wire cable |
| 6: | oil tank |
| 7: | edible oil |
| 8: | oil circulating flow passage |
| 9: | heater |
| 10: | electromagnetic wave generator |
| 11a: | cylinder |
| 11b: | flange edge |
| 12: | concertina tube |
| 13: | relay unit |
| 14: | flat plate |
| 15: | lattice board |
| 16: | oscillating unit |
| 17: | fluororesin |
| 18: | oil container |
| 20: | copper block |
| 21: | iron plate |
| 22: | thermocouple |
| 24: | beaker |
| 25: | outflow pipe |
| 26: | zeta potential measuring apparatus |
| 28: | sample bottle |
| 29: | brass pipe |
| 30: | beaker |
| 31a, 31b: | divider |
| 32a, 32b: | distributor |
| 33a: | R-line generator |
| 33b: | S-line generator |
| 34a, 34b: | electric-power amplifier |
| 36: | plate coated with far-infrared ceramic |
| 39: | belt conveyor type metal net |
| 40: | far-infrared heater |

What is claimed is:

1. A method for preventing deterioration of an edible oil or an industrial oil, comprising the step of:
   conducting an electromagnetic wave treatment of an edible oil or an industrial oil, by electromagnetic waves oscillating with an energy incapable of electromagnetic induction heating, based on (a) an alternating current having a single frequency, (b) an alternating current having a plurality of single frequencies different from one another, or (c) an alternating current having a time-wise varying frequency, the alternating current (a), (b), and (c) each being within a frequency band of 4 kHz to 25 kHz.

2. The method for preventing deterioration of an edible oil or an industrial oil according to claim 1, further comprising the step of: conducting a treatment by a far-infrared heater, combinedly with the electromagnetic wave treatment.

3. The method for preventing deterioration of an edible oil or an industrial oil according to claim 1, further comprising the step of: conducting a treatment by a far-infrared ceramic, combinedly with the electromagnetic wave treatment.

4. An apparatus for preventing deterioration of an edible oil or an industrial oil, comprising:
   a coil part, which is immersed in a fat/oil in an edible oil tank or industrial oil tank, or which is provided near the edible oil tank or industrial oil tank; and
   an electromagnetic wave generator for generating electromagnetic waves oscillating with an energy incapable of electromagnetic induction heating, and configured to flow, through the coil part, (a) an alternating current having a single frequency, (b) an alternating current having a plurality of single frequencies different from one another, or (c) an alternating current having a time-wise varying frequency, the alternating current (a), (b), and (c) each being within a frequency band of 4 kHz to 25 kHz.

5. The apparatus for preventing deterioration of an edible oil or an industrial oil according to claim 4, further comprising a far-infrared heater to be used combinedly with the electromagnetic wave generator.

6. The apparatus for preventing deterioration of an edible oil or an industrial oil according to claim 4, further comprising a far-infrared ceramic to be used combinedly with the electromagnetic wave generator.

* * * * *